(12) United States Patent
Kim et al.

(10) Patent No.: US 12,192,925 B2
(45) Date of Patent: Jan. 7, 2025

(54) ELECTRONIC DEVICE FOR CONTROLLING DUAL CONNECTIVITY AND OPERATING METHOD THEREOF

(71) Applicant: SAMSUNG ELECTRONICS CO., LTD., Suwon-si (KR)

(72) Inventors: Hyeonsoo Kim, Suwon-si (KR); Keonyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 583 days.

(21) Appl. No.: 17/496,194

(22) Filed: Oct. 7, 2021

(65) Prior Publication Data

US 2022/0030531 A1 Jan. 27, 2022

Related U.S. Application Data

(63) Continuation of application No. PCT/KR2021/008751, filed on Jul. 8, 2021.

(30) Foreign Application Priority Data

Jul. 16, 2020 (KR) .................. 10-2020-0087935

(51) Int. Cl.
*H04W 56/00* (2009.01)
*H04W 24/10* (2009.01)
*H04W 76/15* (2018.01)

(52) U.S. Cl.
CPC ......... *H04W 56/001* (2013.01); *H04W 24/10* (2013.01); *H04W 76/15* (2018.02)

(58) Field of Classification Search
None
See application file for complete search history.

(56) References Cited

U.S. PATENT DOCUMENTS 10,045,332 B2  8/2018  Kitazoe et al.
10,285,156 B2  5/2019  Kumar et al.
(Continued)

FOREIGN PATENT DOCUMENTS

JP  2021-193827 A  12/2021
KR  10-2018-0047599 A  5/2018
(Continued)

OTHER PUBLICATIONS

International Search Report and Written Opinion dated Oct. 13, 2021 in corresponding International Application No. PCT/KR2021/008751.
(Continued)

*Primary Examiner* — Pamit Kaur
(74) *Attorney, Agent, or Firm* — Nixon & Vanderhye P.C.

(57) ABSTRACT

Various embodiments of the disclosure relate to a device and a method for controlling dual connectivity (DC) in an electronic device. An electronic device may include: a first communication circuit configured to support a first cellular communication or a second cellular communication; and a second communication circuit configured to support the second cellular communication, wherein the first communication circuit may be configured to: perform first cellular communication with a first node; based on information related to measurement of a synchronization signal of the second cellular communication not being received from the first node, identify information related to transmission of the synchronization signal of the second cellular communication; configure an interval related to measurement of the synchronization signal of the second cellular communication based on the information related to transmission of the synchronization signal of the second cellular communication; and perform measurement of the synchronization signal of the second cellular communication in the interval (Continued)

related to measurement of the synchronization signal of the second cellular communication.

19 Claims, 23 Drawing Sheets

(56) References Cited

U.S. PATENT DOCUMENTS

| | | | |
|---|---|---|---|
| 2019/0174341 A1 | 6/2019 | Chincholi et al. | |
| 2019/0182880 A1 | 6/2019 | Yang et al. | |
| 2019/0313271 A1* | 10/2019 | Yiu | H04W 72/04 |
| 2020/0120527 A1 | 4/2020 | Fan et al. | |
| 2020/0389929 A1 | 12/2020 | Harada et al. | |
| 2021/0152218 A1 | 5/2021 | Cao | |
| 2021/0392649 A1 | 12/2021 | Kim et al. | |
| 2022/0015171 A1 | 1/2022 | Chung et al. | |
| 2022/0116802 A1* | 4/2022 | Kim | H04W 76/27 |
| 2023/0156543 A1* | 5/2023 | Xie | H04W 36/0088 370/332 |
| 2024/0032135 A1* | 1/2024 | Cheng | H04W 24/10 |

FOREIGN PATENT DOCUMENTS

| | | |
|---|---|---|
| KR | 10-2016084 | 8/2019 |
| KR | 10-2020-0058070 | 5/2020 |
| KR | 10-2020-0059631 | 5/2020 |
| KR | 10-2020-0073811 | 6/2020 |
| KR | 10-2424820 B1 | 7/2022 |

OTHER PUBLICATIONS

Ericsson, "Updates for R16 LTE Mobility Enhancements and LTE updates for R16 NR Mobility Enhancements", R2-2005757, 3GPP TSG-RAN WG2 Meeting #110-e, Jun. 1-12, 2020.

* cited by examiner

ND EVICE FOR CONTROLLING
DUAL CONNECTIVITY AND OPERATING
METHOD THEREOF

CROSS-REFERENCE TO RELATED
APPLICATION

This application is a continuation of International Application No. PCT/KR2021/008751 designating the United States, filed on Jul. 8, 2021, which claims priority to Korean Patent Application No. 10-2020-0087935 filed on Jul. 16, 2020 in the Korean Intellectual Property Receiving Office, the disclosures of which are incorporated by reference herein in its entirety.

BACKGROUND

Field

The disclosure relates to a device and a method for controlling dual connectivity (DC) in an electronic device.

Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in 6 GHz bands or less (e.g., 1.8 GHz bands or 3.5 GHz bands) or in higher frequency bands (e.g., 28 GHz bands or 39 GHz bands), to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

Electronic devices may support dual connectivity (DC) capable of simultaneously transmitting and receiving data through two nodes (e.g., a base station). For example, two nodes may include a master node (MN) connected through a first cellular communication (e.g., an LTE network) and a secondary node (SN) connected through a second cellular communication (e.g., a new radio (NR) network).

The electronic device may measure synchronization signals (e.g., synchronization signal/physical broadcast channel blocks (SSBs)) of cells related to the first cellular communication and/or the second cellular communication, based on measurement-related information (e.g., gap configuration) provided from the master node and/or the secondary node.

If the electronic device fails to receive the measurement-related information from the master node and/or the secondary node, the electronic device may not be able to measure synchronization signals of the cells related to the first cellular communication and/or the second cellular communication.

In addition, if the measurement-related information provided from the master node and/or secondary node does not match transmission information (e.g., periodicity, period, and/or offset) of the synchronization signal, the electronic device may not be able to measure the synchronization signals of cells.

SUMMARY

Embodiments of the disclosure provide a device and a method for controlling an operation related to measurement of cells related to the first cellular communication and the second cellular communication in an electronic device supporting dual connectivity.

According to various example embodiments, an electronic device may include: a first communication circuit configured to support a first cellular communication or a second cellular communication; and a second communication circuit configured to support the second cellular communication, wherein the first communication circuit may be configured to: perform first cellular communication with a first node; based on information related to measurement of a synchronization signal of the second cellular communication not being received from the first node, identify information related to transmission of the synchronization signal of the second cellular communication; configure an interval related to measurement of the synchronization signal of the second cellular communication based on the information related to transmission of the synchronization signal of the second cellular communication; and perform measurement of the synchronization signal of the second cellular communication in the interval related to measurement of the synchronization signal of the second cellular communication.

According to various example embodiments, a method of operating an electronic device including a first communication circuit supporting a first cellular communication or a second cellular communication and a second communication circuit supporting the second cellular communication may include: performing first cellular communication with a first node using the first communication circuit; based on information related to measurement of a synchronization signal of the second cellular communication not being received from the first node, identifying information related to transmission of the synchronization signal of the second cellular communication; configuring an interval related to measurement of the synchronization signal of the second cellular communication based on the information related to transmission of the synchronization signal of the second cellular communication; and performing measurement of the synchronization signal of the second cellular communication in the interval related to measurement of the synchronization signal of the second cellular communication.

According to various example embodiments, an electronic device may include: a first communication circuit configured to support a first cellular communication or a second cellular communication; and a second communication circuit configured to support the second cellular communication, wherein the first communication circuit may be configured to perform first cellular communication with a first node; receive information related to measurement of a synchronization signal of the second cellular communication and information related to transmission of a synchronization signal of the second cellular communication from the first node; identify a measurement interval of the synchronization signal of the second cellular communication based on the information related to measurement of the synchronization signal of the second cellular communication; identify a duration of the synchronization signal of the second cellular communication based on the information related to transmission of the synchronization signal of the second cellular communication; based on the measurement interval of the synchronization signal of the second cellular communication not matching the duration, update the measurement interval of the synchronization signal of the second cellular communication based on the duration of the synchronization signal of the second cellular communication;

and perform measurement of the synchronization signal of the second cellular communication in the updated measurement interval.

Advantageous Effects of Invention

According to various example embodiments of the disclosure, in an electronic device in a dual connectivity (DC) environment performing first cellular communication and second cellular communication, if measurement-related information is not received from a master node and/or a secondary node, or if measurement-related information does not match transmission information of a synchronization signal (e.g., an SSB), it is possible to reduce current consumption and packet loss of the electronic device by configuring and/or adjusting periodicity related to the measurement of the synchronization signal and/or the length of a measurement interval, based on transmission information of the synchronization signal.

According to various example embodiments, in an electronic device in a dual connectivity (DC) environment performing first cellular communication and second cellular communication, it is possible to reduce current consumption of the electronic device by updating measurement-related information received from a master node and/or a secondary node, based on operation status information of the electronic device (e.g., battery status, charging status, and/or service type).

According to various example embodiments, in an electronic device in a dual connectivity (DC) environment performing first cellular communication and second cellular communication, if measurement-related information received from a master node and/or a secondary node overlaps interval information for a scheduling request (SR), it is possible to perform scheduling request and measurement of the synchronization signal by adjusting periodicity related to the measurement of the synchronization signal and/or the length of a measurement interval, based on transmission information of the synchronization signal.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments will be described in greater detail with reference to the figures.

Figure 1:
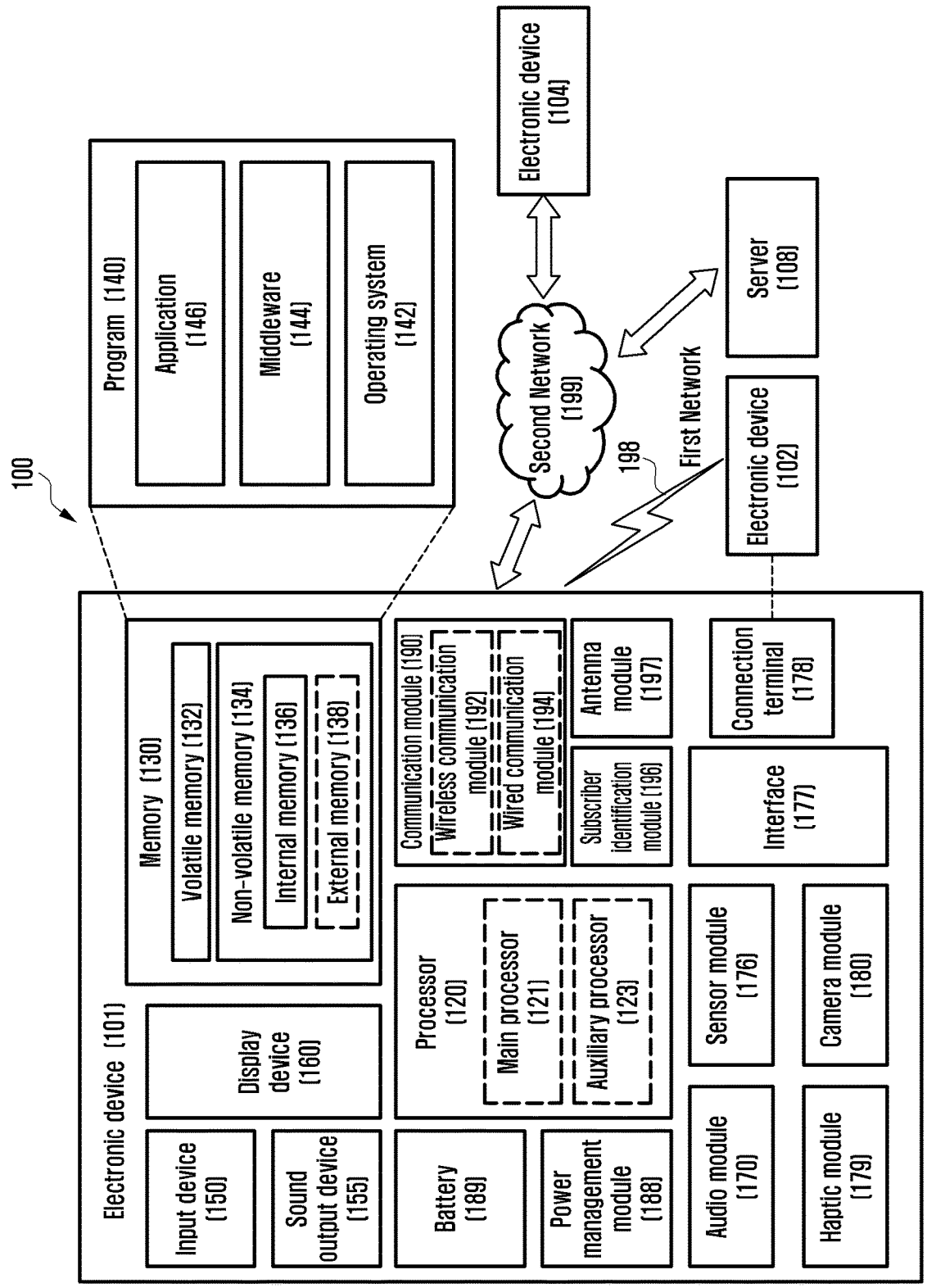
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
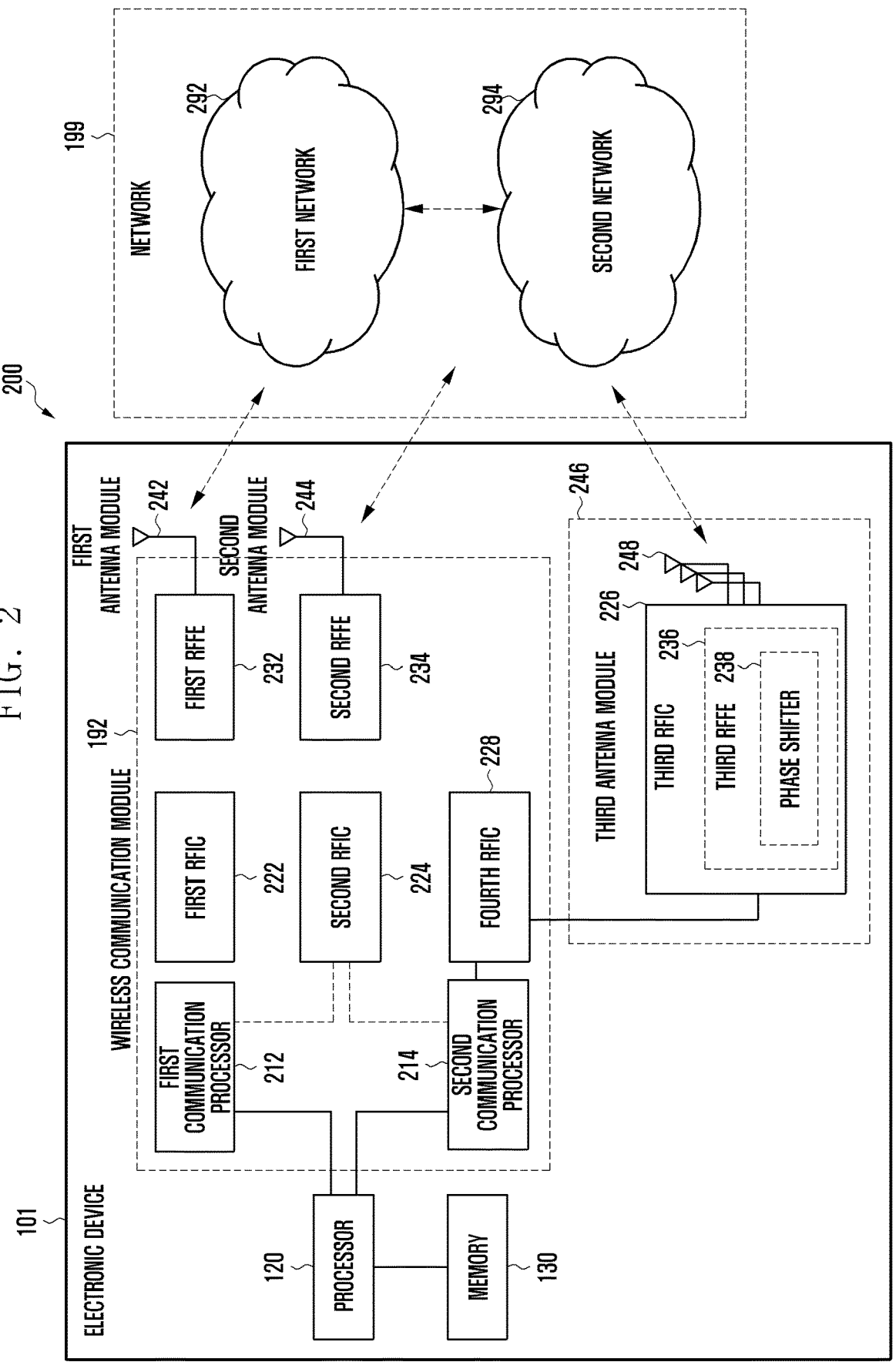
FIG. 2 is a block diagram illustrating an electronic device supporting legacy network communication and 5G network communication according to various embodiments.

FIG. 2 is a block diagram 200 illustrating an example electronic device 101 supporting legacy network communication and 5G network communication according to various embodiments.

Referring to FIG. 2, according to various embodiments, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may include the processor 120 and the memory 130. The network 199 may include a first network 292 and a second network 294. According to an embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be at least a part of the wireless communication module 192. According to an embodiment, the fourth RFIC 228 may be omitted, or may be included as a part of the third RFIC 226.

The first communication processor 212 may establish a communication channel of a band to be used for wireless communication with the first network 292, and may support legacy network communication via the established communication channel. According to an embodiment, the first network may be a legacy network including second generation (2G), third generation (3G), fourth generation (4G), or long-term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established communication channel. According to an embodiment, the second network 294 may be a 5G network (e.g., new radio (NR)) defined in 3GPP. In addition, according to an embodiment, the first communication processor 212 or the second communication processor 214 may establish a communication channel corresponding to another designated band (e.g., approximately 6 GHz or less) among bands to be used for wireless communication with the second network 294, and may support 5G network communication via the established communication channel. According to an embodiment, the first communication processor 212 and the second communication processor 214 may be implemented in a single chip or a single package. According to an embodiment, the first communication processor 212 or the second communication processor 214 may be implemented in a single chip or a single package, together with the processor 120, the sub-processor 123, or the communication module 190.

According to an embodiment, the first communication processor 212 may perform data transmission or reception with the second communication processor 214. For example, data which has been classified to be transmitted via the second network 294 may be changed to be transmitted via the first network 292.

In this instance, the first communication processor 212 may receive transmission data from the second communication processor 214. For example, the first communication processor 212 may perform data transmission or reception with the second communication processor 214 via an inter-processor interface. The inter-processor interface may be implemented as, for example, a universal asynchronous receiver/transmitter (UART) (e.g., a high speed-UART (HS-UART)) or a peripheral component interconnect bus express (PCIe), but the type of interface is not limited thereto. For example, the first communication processor 212 and the second communication processor 214 may exchange control information and packet data information using, for example, a shared memory. For example, the first communication processor 212 may perform transmission or reception of various types of information such as sensing information, information associated with an output strength, and resource block (RB) allocation information, with the second communication processor 214.

Depending on implementation, the first communication processor 212 may not be directly connected to the second communication processor 214. In this instance, the first communication processor 212 may perform data transmission or reception with the second communication processor 214, via the processor 120 (e.g., an application processor). For example, the first communication processor 212 and the second communication processor 214 may perform data transmission or reception via the processor 120 (e.g., an application processor) and a HS-UART interface or a PCIe interface, but the type of interface is not limited. For example, the first communication processor 212 and the second communication processor 214 may exchange control information and packet data information using the processor 120 (e.g., an application processor) and a shared memory. According to an embodiment, the first communication processor 212 and the second communication processor 214 may be implemented in a single chip or a single package. According to various embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in the range of approximately 700 MHz to 3 GHz, which is used in the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal into a baseband signal so that the baseband signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) in an Sub6 band (e.g., approximately 6 GHz or less) used in the second network 294 (e.g., a 5G network). In the case of reception, a 5G Sub6 RF signal may be obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used in the second network 294 (e.g., a 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal into a baseband signal so that the signal is processed by the second communication processor 214. According to an embodiment, the third RFFE 236 may be implemented as a part of the third RFIC 226.

According to an embodiment, the electronic device 101 may include the fourth RFIC 228, separately from or, as a part of, the third RFIC 226. In this instance, the fourth RFIC 228 may convert a baseband signal produced by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above6 RF signal. In the case of reception, a 5G Above6 RF signal may be received from the second network 294 (e.g., a 5G network) via an antenna (e.g., the antenna 248), and may be converted into an IF signal by the third RFIC 226. The fourth RFIC 228 may convert the IF signal into a baseband signal so that the second communication processor 214 is capable of processing the baseband signal.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or single package. According to an embodiment, at least one of the first antenna module 242 or the second antenna module 244 may be omitted or may be combined with another antenna module, to process RF signals of a plurality of corresponding bands.

According to an embodiment, the third RFIC 226 and the antenna 248 may be disposed in the same substrate, and may form a third antenna module 246. For example, the wireless communication module 192 or the processor 120 may be disposed in a first substrate (e.g., a main PCB). In this instance, the third RFIC 226 is disposed in a part (e.g., a lower part) of a second substrate (e.g., a sub PCB) different from the first substrate, and the antenna 248 is disposed in another part (e.g., an upper part), so that the third antenna module 246 may be formed. By disposing the third RFIC 226 and the antenna 248 in the same substrate, the length of a transmission line therebetween may be reduced. For example, this may reduce a loss (e.g., a diminution) of a high-frequency band signal (e.g., approximately 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be implemented as an antenna array including a plurality of antenna elements which may be used for beamforming. In this instance, the third RFIC 226, for example, may include a plurality of phase shifters 238 corresponding to a plurality of antenna elements, as a part of the third RFFE 236. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of a 5G Above6 RF signal received from the outside via a corresponding antenna element into the same or substantially the same phase. This may enable transmission or reception via beamforming between the electronic device 101 and the outside.

The second network 294 (e.g., a 5G network) may operate independently (e.g., Standalone (SA)) from the first network 292 (e.g., a legacy network), or may operate by being connected thereto (e.g., Non-Standalone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access the access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

Figure 3:
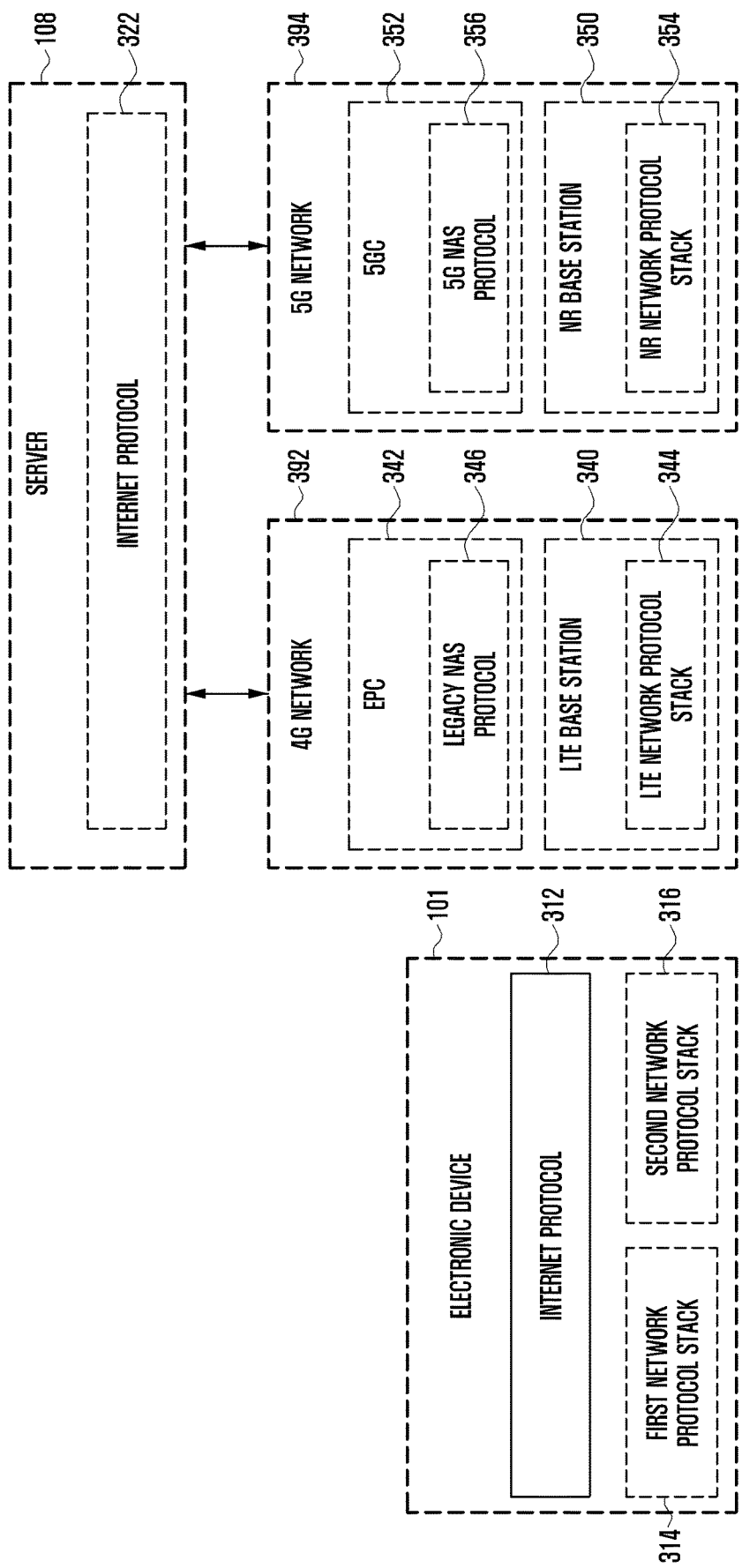
FIG. 3 is a diagram illustrating a protocol stack structure of a network of legacy communication and/or 5G communication according to various embodiments.

FIG. 3 is a diagram illustrating a protocol stack structure of a network 100 of 4G communication and/or 5G communication according to various embodiments.

Referring to FIG. 3, the network 100 according to various embodiments may include the electronic device 101, a 4G network 392, a 5G network 394, and the server 108.

According to various embodiments, the electronic device 101 may include an Internet protocol 312, a first communication protocol stack 314, and a second communication protocol stack 316. For example, the electronic device 101 may communicate with the server 108 via the 4G network 392 and/or 5G network 394.

According to an embodiment, the electronic device 101 may perform Internet communication associated with the server 108 using the Internet protocol 312 (e.g., a transmission control protocol (TCP), a user datagram protocol (UDP), or an internet protocol (IP)). For example, the Internet protocol 312 may be performed in a main processor (e.g., the main processor 121 of FIG. 1) included in the electronic device 101.

According to an embodiment, the electronic device 101 may perform wireless communication with the 4G network 392 using the first communication protocol stack 314. According to an embodiment, the electronic device 101 may perform wireless communication with the 5G network 394 using the second communication protocol stack 316. For example, the first communication protocol stack 314 and the second communication protocol stack 316 may be performed by one or more communication processors (e.g., the wireless communication module 192 of FIG. 1) included in the electronic device 101.

According to various embodiments, the server 108 may include the Internet protocol 322. The server 108 may perform transmission or reception of data related to the Internet protocol 322 with the electronic device 101 via the 4G network 392 and/or 5G network 394. According to an embodiment, the server 108 may include a cloud computing server existing outside the 4G network 392 or the 5G network 394. According to an embodiment, the server 108 may include an edge computing server (or a mobile edge computing (MEC) server) located inside at least one of the 4G network 392 or the 5G network 394.

According to various embodiments, the 4G network 392 may include a long-term evolution (LTE) base station 340 and an evolved packet core (EPC) 342. The LTE base station 340 may include an LTE communication protocol stack 344. The EPC 342 may include a legacy non-access stratum (NAS) protocol 346. The 4G network 392 may perform LTE wireless communication with the electronic device 101 using the LTE communication protocol stack 344 and the legacy NAS protocol 346.

According to various embodiment, the 5G network 394 may include a new radio (NR) base station 350 and a 5th generation core (5GC) 352. The NR base station 350 may include an NR communication protocol stack 354. The 5GC 352 may include a 5G NAS protocol 356. The 5G network 394 may perform NR wireless communication with the electronic device 101 using the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting or receiving a control message and a user plane protocol for transmitting or receiving user data. For example, the control message may include a message related to at least one of security control, bearer setup, authentication, registration, or mobility management. For example, the user data may include, for example, the remaining data, excluding the control message.

According to an embodiment, the control plane protocol and the user plane protocol may include a physical (PHY) layer, a medium access control (MAC) layer, a radio link control (RLC) layer, or a packet data convergence protocol (PDCP) layer. For example, the PHY layer may perform channel coding and modulation of data received from a higher layer (e.g., the MAC layer), and transmit the same to a wireless channel, and may perform demodulation and decoding of data received via a wireless channel and transmit the same to a higher layer. The PHY layer included in the second communication protocol stack 316 and the NR communication protocol stack 354 may further perform an operation related to beamforming. For example, the MAC layer may logically/physically map data to a wireless channel to be transmitted or received, and may perform hybrid automatic repeat request (HARQ) for error correction. For example, the RLC layer may perform concatenation, segmentation, or reassembly of data, may identify the order of data, may perform reordering, and may perform redundancy check. For example, the PDCP layer may perform an operation of ciphering control data and user data, and an operation related to data integrity. The second communication protocol stack 316 and the NR communication protocol stack 354 may further include a service data adaptation protocol (SDAP). For example, the SDAP may manage wireless bearer allocation based on the quality of service (QoS) of user data.

According to various embodiments, the control plane protocol may include a radio resource control (RRC) layer and a non-access stratum (NAS) layer. For example, the RRC layer may process control data related to radio bearer setup, paging, or mobility management. For example, the NAS may process a control message related to authentication, registration, and mobility management.

Figure 4A:
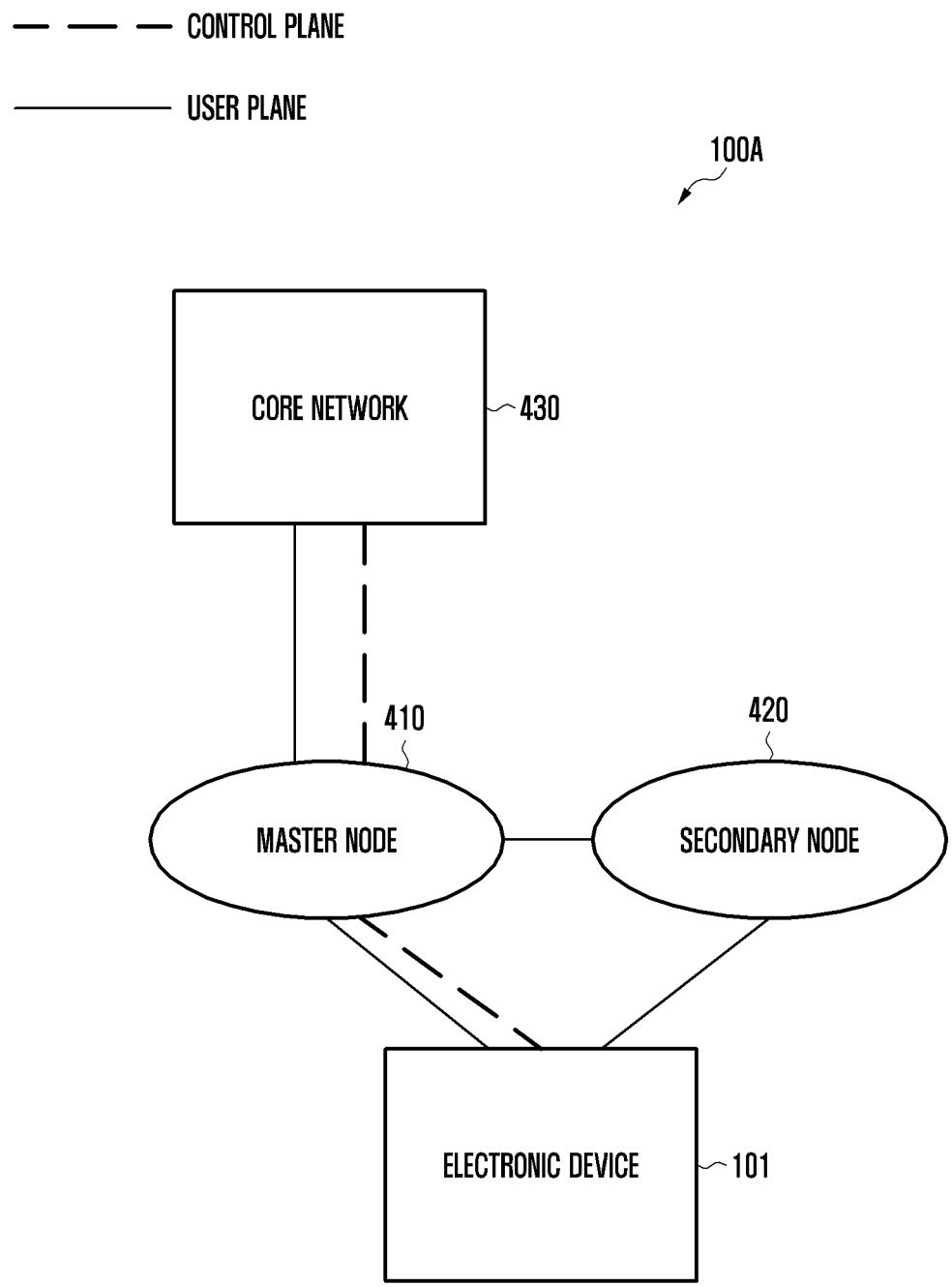
FIGS. 4A and 4B are diagrams illustrating wireless communication systems providing networks of legacy communication and/or 5G communication according to various embodiments.
Figure 4B:
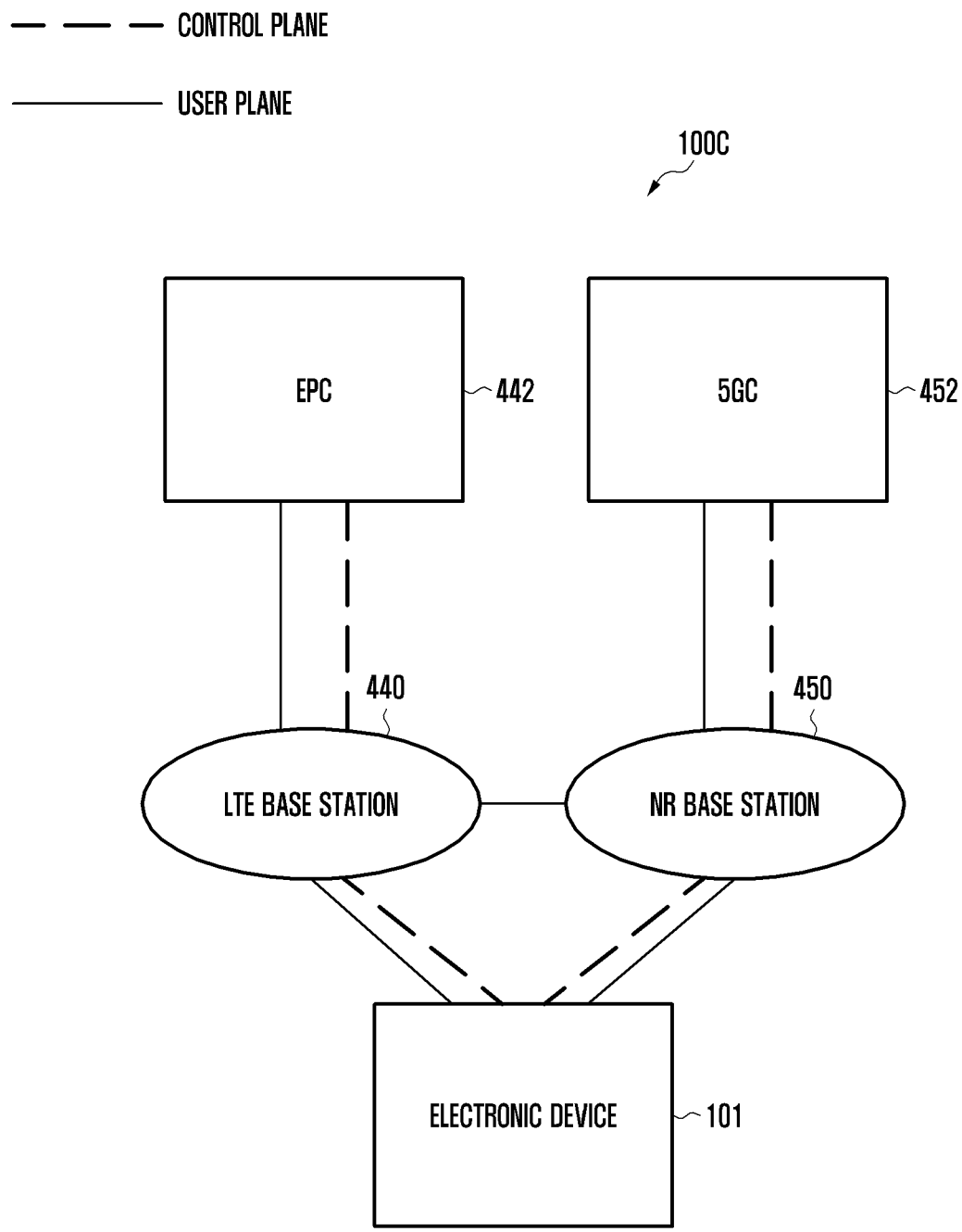

FIGS. 4A and 4B are diagrams illustrating example wireless communication systems providing networks of 4G communication and/or 5G communication according to various embodiments.

Referring to FIGS. 4A and 4B, a network environment 100A and/or 100C may include at least one of a 4G network and a 5G network. For example, the 4G network may include an LTE base station 440 (e.g., eNB (eNodeB)) in the 3GPP standard for supporting wireless access of the electronic device 101, and an evolved packet core (EPC) 442 that manages 4G communication. For example, the 5G network may include a new radio (NR) base station 450 (e.g., gNB (gNodeB)) for supporting wireless access of the electronic device 101, and a 5th generation core (5GC) 452 that manages 5G communication of the electronic device 101.

According to various embodiments, the electronic device 101 may transmit and receive control messages and user data through 4G communication and/or 5G communication. For example, the control message may include a message related to at least one of security control, bearer setup, authentication, registration, or mobility management of the electronic device 101. For example, user data may indicate user data excluding the control message transmitted and received between the electronic device 101 and a core network 430 (e.g., the EPC 442).

Referring to FIG. 4A, according to various embodiments, the electronic device 101 may transmit and receive at least one of the control message or user data to and from at least a part of the 5G network (e.g., the NR base station 450 and the 5GC 452) using at least a part of the 4G network (e.g., the LTE base station 440 and the EPC 442).

According to various embodiments, the network environment 100A may provide wireless communication dual connectivity (multi-radio access technology (RAT) dual connectivity) (MR-DC) to the LTE base station 440 and the NR base station 450, and may include a network environment capable of transmitting and receiving control messages to and from the electronic device 101 through one core network 430 among the EPC 442 or the 5GC 452.

According to various embodiments, in the MR-DC environment, one of the LTE base station 440 or the NR base station 450 may operate as a master node (MN) 410, and the other may operate as a secondary node (SN) 420. The MN 410 may be connected to the core network 430 to transmit and receive control messages. The MN 410 and the SN 420 may be connected to each other through a network interface, thereby transmitting and receiving messages related to management of radio resources (e.g., communication channels).

According to various embodiments, the MN 410 may be configured as the LTE base station 440, the SN 420 may be configured as the NR base station 450, and the core network 430 may be configured as the EPC 442. For example, control messages may be transmitted and received through the LTE base station 440 and the EPC 442, and user data may be transmitted and received through the LTE base station 440 and the NR base station 450.

Referring to FIG. 4B, according to various embodiments, the legacy network and the 5G network may independently provide transmission and reception of data. For example, the electronic device 101 and the EPC 442 may transmit and receive control messages and user data through the LTE base station 440. As another example, the electronic device 101 and the 5GC 452 may transmit and receive control messages and user data through the NR base station 450.

According to various embodiments, the electronic device 101 may be registered in at least one of the EPC 442 and the 5GC 452 to transmit and receive control messages.

According to various embodiments, the EPC 442 or the 5GC 452 may interwork with each other to manage communication of the electronic device 101. For example, information on the movement of the electronic device 101 may be transmitted and received through an interface (not shown) (e.g., an N26 interface) between the EPC 442 and the 5GC 452.

Figure 5:
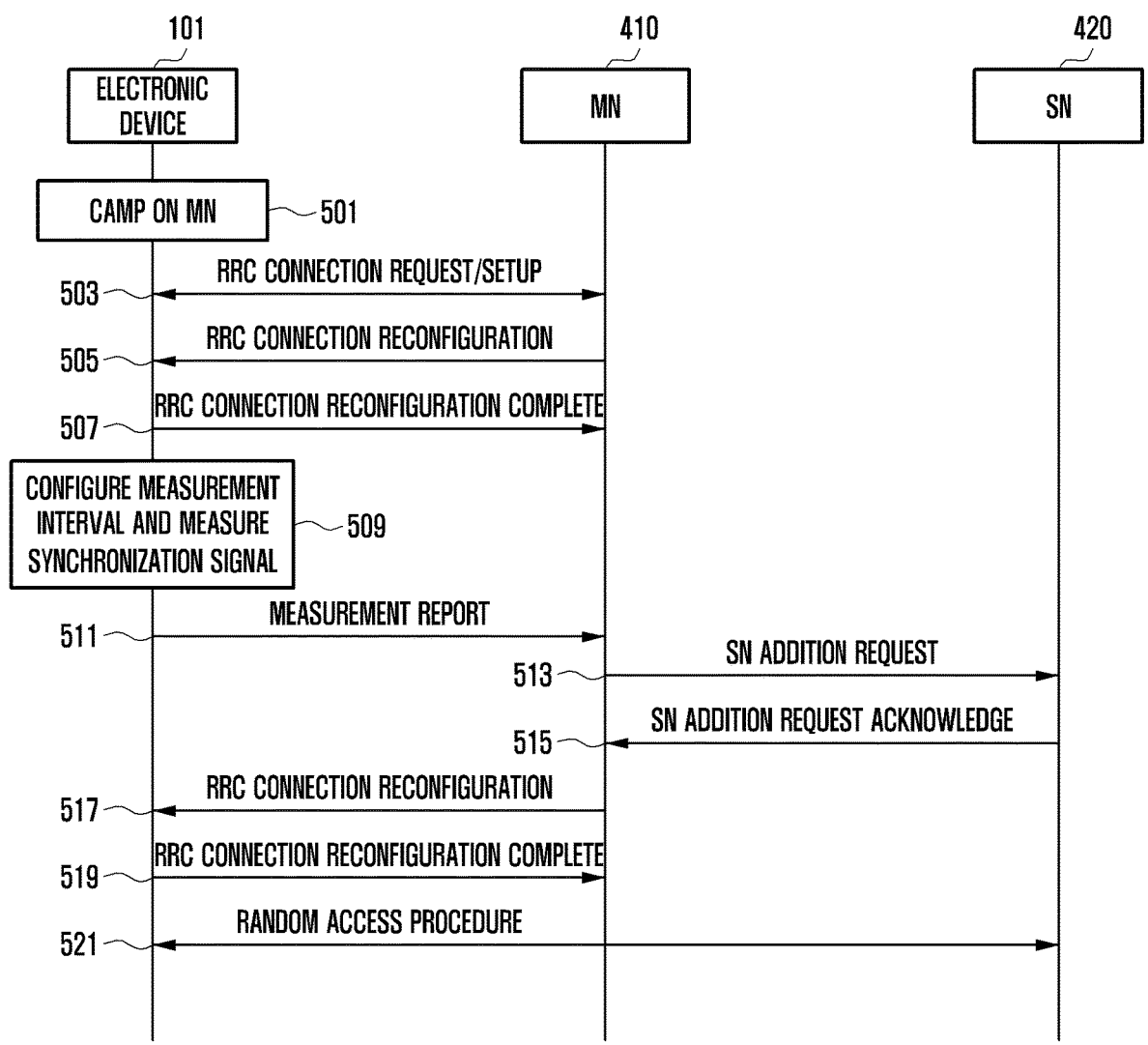
FIG. 5 is a signal flow diagram illustrating an example method for providing a measurement report in an electronic device according to various embodiments.

FIG. 5 is a signal flow diagram illustrating an example method for providing a measurement report in an electronic device according to various embodiments.

Referring to FIG. 5, according to various embodiments, the electronic device 101 may camp on the MN 410 (e.g., the LTE base station 440) in operation 501. According to an embodiment, the electronic device 101 may transmit a random access channel (RACH) signal (e.g., a physical RACH (PRACH) preamble). If a response signal (e.g., a PRACH response) to the RACH signal is received from the MN 410, the electronic device 101 may access the MN 410 (e.g., the LTE base station 440).

According to various embodiments, the electronic device 101 and the MN 410 may establish an RRC connection in operation 503. According to an embodiment, the electronic device 101 may transmit a signal related to an RRC connection request to the MN 410. For example, the MN 410 may transmit a signal related to RRC connection setup to the electronic device 101 in response to the signal related to the RRC connection request. For example, the signal related to the RRC connection setup may include information (e.g., RadioResourceConfigDedicated) related to a signalling radio bearer (SRB), a data radio bearer (DRB), medium access control (MAC), and/or physical (PHY) configurations. For example, if the signal related to RRC connection setup is received, the electronic device 101 may transmit a signal related to capability of the electronic device 101 to the MN 410, thereby establishing an RRC connection. For example, the signal related to capability of the electronic device 101 may include information related to a non-access stratum (NAS) layer and/or information related to whether dual connectivity is supported.

According to various embodiments, in operation 505, the MN 410 may transmit the signal related to RRC connection reconfiguration to the electronic device 101 for dual connectivity of the electronic device 101. According to an embodiment, if it is identified that dual connectivity of the electronic device 101 using 5G communication is permitted based on information provided from a mobility management entity (MME), the MN 410 may transmit a signal related to RRC connection reconfiguration to the electronic device 101. For example, the signal related to RRC connection reconfiguration may include information for measuring and reporting the performance of the 5G network in order for the electronic device 101 to play the role of a secondary node (SN). The signal related to RRC connection reconfiguration may include information related to an object to be measured, information related to transmission of a synchronization signal (e.g., SS/PBCH block measurement timing configuration (STMC)), information related to measurement of a synchronization signal (e.g., gap configuration), and/or information on neighboring cells.

According to various embodiments, in operation 507, the electronic device 101 may transmit a response signal (RRC connection reconfiguration complete) to the signal related to RRC connection reconfiguration to the MN 410. According to an embodiment, the MN 410 may identify reception of the signal related to RRC connection reconfiguration of the electronic device 101, based on the response signal to the signal related to RRC connection reconfiguration.

According to various embodiments, in operation 509, the electronic device 101 may configure (or update) the length and/or periodicity of a measurement interval of a synchronization signal, based on the information related to transmission of the synchronization signal (e.g., STMC) of the 5G network received from the MN 101. According to an embodiment, if the signal related to RRC connection reconfiguration does not include information related to measurement of the synchronization signal (e.g., gap configuration), the electronic device 101 may configure the length and/or periodicity of the measurement interval of the synchronization signal, based on the information related to transmission of the synchronization signal (e.g., STMC) of the 5G network. For example, the electronic device 101 may configure the length of the measurement interval of the synchronization signal, based on the information related to transmission of the synchronization signal and/or duration of the synchronization signal of the 5G network identified from the neighboring-cell information. For example, the electronic device 101 may configure measurement periodicity of the synchronization signal, based on the periodicity of the synchronization signal of the 5G network identified from the information related to transmission of the synchronization signal.

According to an embodiment, if the signal related to RRC connection reconfiguration includes the information related to measurement of the synchronization signal (e.g., gap configuration), the electronic device 101 may identify whether the duration of the synchronization signal of the 5G network matches the measurement interval of the synchronization signal of the 5G network corresponding to the information related to measurement of the synchronization signal. For example, if the duration of the synchronization signal of the 5G network does not match the measurement interval, the electronic device 101 may update the length and/or periodicity of the measurement interval of the synchronization signal, based on information related to transmission of the synchronization signal (e.g., STMC) of the 5G network. For example, the electronic device 101 may update the length of the measurement interval of the synchronization signal, based on the duration of the synchronization signal of 5G communication identified from the information related to transmission of the synchronization signal. For example, the electronic device 101 may update the measurement periodicity of the synchronization signal, based on the periodicity of the synchronization signal of 5G communication identified from the information related to transmission of the synchronization signal. For example, the duration of the synchronization signal of the 5G network may not match the measurement interval in the case where the node (e.g., the SN 420) that configures the duration of the synchronization signal of 5G communication is different from the node (e.g., the MN 410) that configures the measurement interval of the synchronization signal of 5G communication and in the case where information related to the duration of the synchronization signal and the measurement interval are not shared between the two nodes.

According to various embodiments, in operation 511, the electronic device 101 may measure a reference signal (e.g., a synchronization signal) of a neighboring cell, based on the length and/or periodicity of the measurement interval of the synchronization signal, and may report the same to the MN 410.

According to various embodiments, the MN 410 may configure the SN 420 (e.g., the NR base station 450) for dual connectivity of the electronic device 101, based on the information related to the measurement report received from the electronic device 101. The MN 410 may transmit, to the SN 420, a signal related to an SN addition request in operation 513. For example, the signal related to an SN addition request may include information related to at least one bearer to be moved to the SN 420.

According to various embodiments, the SN 420 may allocate radio resources (e.g., 5G communication resources) for at least one bearer requested by the MN 410. The SN 420 may transmit a response signal (e.g., addition request acknowledge) including information related to the radio resources for at least one bearer to the MN 410 in operation 515.

According to various embodiments, in operation 517, the MN 410 may transmit, to the electronic device 101, a signal related to RRC connection reconfiguration including information related to the bearer movement to the SN 420. For example, the signal related to RRC connection reconfiguration may include information related to connection between the electronic device 101 and the SN 420. For example, the information related to the connection between the electronic device 101 and the SN 420 may include RACH configuration, a cell-radio network temporary identifier (C-RNTI), and/or radio resource information of 5G communication.

According to various embodiments, in operation 519, the electronic device 101 may transmit a response signal (RRC connection reconfiguration complete) to the signal related to RRC connection reconfiguration to the MN 410. According to an embodiment, the MN 410 may identify reception of the signal related to RRC connection reconfiguration of the electronic device 101, based on the response signal to the signal related to RRC connection reconfiguration.

According to various embodiments, in operation 521, the electronic device 101 may perform a random access procedure to the SN 420, based on the information related to the connection between the electronic device 101 and the SN 420 provided from the MN 410.

Figure 6A:
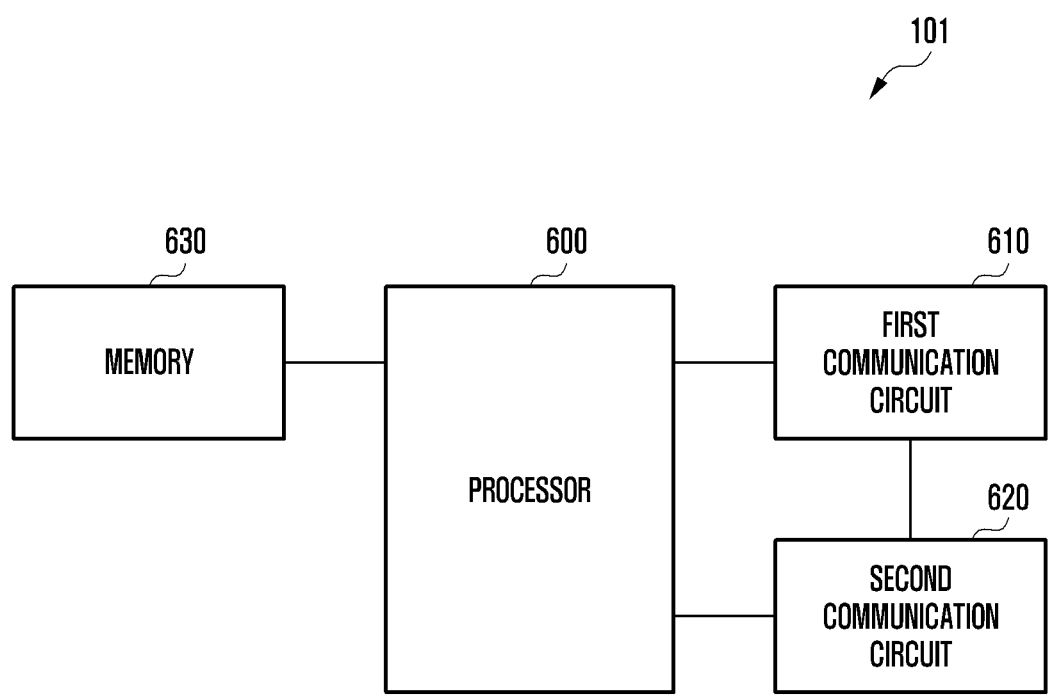
FIGS. 6A and 6B are block diagrams illustrating an example electronic device supporting dual connectivity according to various embodiments.
Figure 6B:
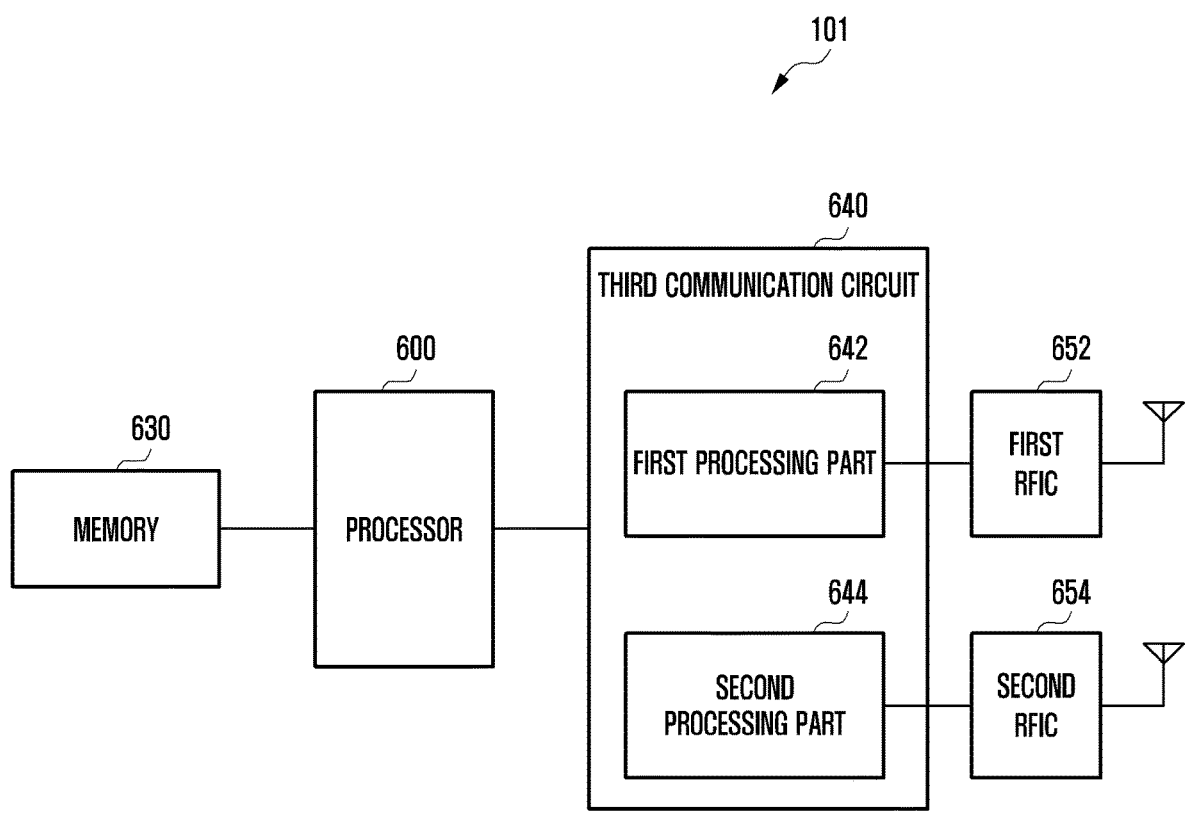

FIGS. 6A and 6B are block diagrams illustrating example configurations of an electronic device supporting dual connectivity according to various embodiments.

Referring to FIG. 6A, according to various embodiments, the electronic device 101 may include a processor (e.g., including processing circuitry) 600, a first communication circuit 610, a second communication circuit 620, and/or a memory 630. According to an embodiment, the processor 600 may be substantially the same as or similar to the processor 120 (e.g., the application processor) in FIG. 1, or may be included in the processor 120. The first communication circuit 610 and/or the second communication circuit 620 may be substantially the same as or similar to the wireless communication module 192 in FIG. 1, or may be included in the wireless communication module 192. The memory 630 may be substantially the same as or similar to the memory 130 in FIG. 1, or may be included in the memory 130. According to an embodiment, the first communication circuit 610 and the second communication circuit 620 may be implemented in a single chip or a single package. According to an embodiment, the processor 600, the first communication circuit 610, and the second communication circuit 620 may be implemented in a single chip or a single package.

According to various embodiments, the processor 600 may be operatively connected to the first communication circuit 610 and/or the second communication circuit 620. According to an embodiment, the processor 600 may include various processing circuitry and interact with the first communication circuit 610 or the second communication circuit 620 through, for example, an application processor-to-communication processor (AP2CP) interface. For example, the AP2CP interface may include at least one of a shared memory type or peripheral component interconnect-express (PCIe). According to an embodiment, the first communication circuit 610 and the second communication circuit 620 may interact with each other through, for example, a communication processor-to-communication processor (CP2CP) interface. For example, the CP2CP interface may include a universal asynchronous receiver/transmitter (UART).

According to various embodiments, the first communication circuit 610 may perform first cellular communication with a first node (e.g., the MN 410 in FIG. 4A). According to an embodiment, the first communication circuit 610 may perform first cellular communication to transmit and/or receive control messages and data to and/or from the first node (e.g., MN 410). According to an embodiment, the first communication circuit 610 may perform second cellular communication to receive a control message (e.g., synchronization signal) of a second node (e.g., the SN 420). For example, the first cellular communication may include any one of the various cellular communication methods supported by the electronic device 101. For example, the first cellular communication may include at least one of any one of 4th generation mobile communication methods (e.g., long-term evolution (LTE), LTE-advanced (LTE-A), or LTE advanced pro (LTE-A pro)) or any one of 5th generation mobile communication methods (e.g., 5G or NR) (e.g., using a frequency band of about 6 GHz or less). For example, the first node (e.g., the MN 410) may indicate the base station supporting the first cellular communication. According to an embodiment, the first communication circuit 610 may include a communication processor related to the first cellular communication (e.g., the first communication processor 212 in FIG. 2), an RFIC (e.g., the first RFIC 222 in FIG. 2), and/or an RFFE (e.g., the first RFFE 232 in FIG. 2). According to an embodiment, the first communication circuit 610 may process signals in a first frequency band (e.g., about 700 MHz to about 5 GHz). For example, the first frequency band may include at least a portion of the frequency band supported by the second cellular communication and the frequency band supported by the first cellular communication.

According to various embodiments, the second communication circuit 620 may perform second cellular communication with a second node (e.g., the SN 420 in FIG. 4A). According to an embodiment, the second communication circuit 620 may perform second cellular communication to transmit and/or receive data to and/or from the second node (e.g., the SN 420). For example, the second cellular communication may include any one of the various cellular communication methods supported by the electronic device 101. For example, the second cellular communication may include any one of 5G mobile communication methods (e.g., 5G) (e.g., using a frequency band of about 6 GHz or higher) or any one of 4G mobile communication methods (e.g., LTE, LTE-A, or LTE-A pro). The second node (e.g., the SN 420) may indicate the base station that supports second cellular communication. According to an embodiment, the second communication circuit 620 may include a communication processor related to the second cellular communication (e.g., the second communication processor 214 in FIG. 2), an RFIC (e.g., the third RFIC 226 in FIG. 2), and/or an RFFE (e.g., the third RFFE 236 in FIG. 2). According to an embodiment, the second communication circuit 620 may process signals in a second frequency band (e.g., about 6 GHz or less) supported by the second cellular communication. For example, the first frequency band supported by the first communication circuit 610 may include at least a portion of the second frequency band. For example, the first communication circuit 610 may measure a synchronization signal related to the second cellular communication through at least a portion of the first frequency band (e.g., about 2.8 GHz or 3.5 GHz) overlapping at least a portion of the second frequency band. When a second node (e.g., the SN420) supporting the second cellular communication is configured based on a measurement result of the synchronization signal performed by the first communication circuit 610 (e.g., operations 511 to 519 in FIG. 5), the second communication circuit 620 may perform a random access procedure to the second node (e.g., the SN 420) (e.g., operation 521 in FIG. 5).

According to various embodiments, the dual connectivity of the electronic device 101 may include an E-UTRA-NR dual connectivity (EN-DC) environment of the first cellular communication in the 4th generation mobile communication method and the second cellular communication in the 5th generation mobile communication method, an NR-E-UTRA dual connectivity (NE-DC) environment of the first cellular communication in the 5$^{th}$ generation mobile communication method and the second cellular communication in the 4th generation mobile communication method, an NR-NR dual connectivity (NR-DC) environment of the first cellular communication that supports a first method (e.g., about 6 GHz or less) in the 5$^{th}$ mobile communication method and the second cellular communication method that supports a second method (e.g., about 6 GHz or more) in the 5th generation mobile communication method, or a DC environment of the first cellular communication that supports a first method in the 4$^{th}$ generation mobile communication method and the second cellular communication method that supports a second method in the 4th generation mobile communication method.

According to various embodiments, the electronic device 101 may use both the first cellular communication and the second cellular communication. According to an embodiment, the electronic device 101 may transmit and/or receive control data for wireless communication through the first cellular communication. For example, the first communication circuit 610 may transmit and/or receive information related to wireless connection of the first cellular communication and/or the second cellular communication to and/or from the first node (e.g., the MN 410) through the first cellular communication. For example, the information related to wireless connection may include information related to transmission of a synchronization signal of the first cellular communication and/or the second cellular communication (e.g., SS/PBCH block measurement timing configuration (SMTC)), information related to measurement of a synchronization signal (e.g., gap configuration), and/or information related to a scheduling request (e.g., a scheduling request (SR)).

According to an embodiment, the synchronization signal may include a synchronization signal/physical broadcast channel block (SSB) defined in 3GPP standard TS 38.331. For example, the electronic device 101 may synchronize with the second node (e.g., the SN 420 in FIG. 4A) using the SSB. For example, the electronic device 101 may receive the SSB to measure the strength of the signal. For example, the SSB may include a primary synchronization signal (PSS), a secondary synchronization signal (SSS), and a physical broadcasting channel (PBCH). For example, the electronic device 101 may transmit results of measuring the PSS and/or the SSS (e.g., synchronization signal reference signal received power (SS-RSRP)) to the first node (e.g., the MN 410). For example, if a measurement report event specified by the first node (e.g., the MN 410) is satisfied based on information (e.g., a measurement object) related to the measurement report received from the first node (the MN 410), the electronic device 101 may transmit a measurement report to the first node (e.g., the MN 410). For example, in the case where the event included in the information related to the measurement report is "B1-NR", if the result of measuring the SSB exceeds a threshold, the electronic device 101 may transmit a measurement report to the first node (e.g., the MN 410).

According to an embodiment, SMTC, which is transmission-related information of the synchronization signal (e.g., the SSB), may include information related to SSB periodicity, duration of the interval (or the length of the interval) in which the SSB is transmitted (SSB duration), and/or a start point of the interval in which the SSB is transmitted (SSB offset). For example, the SMTC may be included in the form of an information element (IE) such as measurement timing configuration (SSB-MTC) of s signal related to RRC reconfiguration (RRCReconfiguration) or MTC-SSB-NR-r15 of a signal related to the RRC Connection Reconfiguration (RRCConnectionReconfiguration).

According to an embodiment, information related to measurement of a synchronization signal (e.g., gap configuration), which is intended to configure an interval for measuring a synchronization signal, may be received from the first node (e.g., the MN 410). The information related to measurement of the synchronization signal may include a starting point (offset) of the measurement interval, the length of the measurement interval, and/or measurement periodicity. For example, the information related to measurement of the synchronization signal may be included in MeasGap-Config IE of the signal related to RRC connection reconfiguration (RRCConnectionReconfiguration).

According to an embodiment, the electronic device 101 may transmit and/or receive data through the first cellular communication and/or the second cellular communication. For example, the electronic device 101 may transmit and/or receive data through the first cellular communication and/or the second cellular communication using the first communication circuit 610 and/or the second communication circuit 620.

According to various embodiments, the first communication circuit 610 may obtain information related to measurement of a synchronization signal of the first cellular communication from the first node through the first cellular communication. The first communication circuit 610 may measure synchronization signals of cells related to the first cellular communication, based on the information related to measurement of the synchronization signal of the first cellular communication. For example, the information related to measurement of the synchronization signal of the first cellular communication may include information related to periodicity and/or a measurement interval for measuring the synchronization signals of the cells related to the first cellular communication.

According to various embodiments, the first communication circuit 610 may obtain information related to measurement of the synchronization signal of the second cellular communication from the first node through the first cellular communication. The first communication circuit 610 may measure synchronization signals of cells related to the second cellular communication, based on the information related to measurement of the synchronization signal of the second cellular communication. For example, the first communication circuit 610 may perform measurement of the synchronization signals of the cells related to the second cellular communication in the interval related to measurement of the synchronization signal of the second cellular communication. For example, the first communication circuit 610 may measure the synchronization signals of the cells related to the second cellular communication through the frequency band of the second cellular communication during the interval related to measurement of the synchronization signal of the second cellular communication. Accordingly, the first communication circuit 610 may stop transmitting and/or receiving control messages and/or data related to the first cellular communication during the interval related to measurement of the synchronization signal of the second cellular communication. If the interval related to measurement of the synchronization signal of the second cellular communication ends, the first communication circuit 610 may resume transmitting and/or receiving control messages and/or data related to the first cellular communication. For example, the information related to measurement of the synchronization signal of the second cellular communication may include information related to periodicity and/or a measurement interval for measuring the synchronization signals of the cells related to the second cellular communication.

According to various embodiments, the first communication circuit 610 may configure the information related to measurement of the synchronization signal of the second cellular communication. According to an embodiment, if the information related to measurement of the synchronization signal of the second cellular communication transmitted from the first node is not identified due to the radio state (or wireless environment) of the first cellular communication, the first communication circuit 610 may configure the length of the interval for measuring the synchronization signal of the second cellular communication, based on the information related to transmission of the synchronization signal of the second cellular communication. For example, the first communication circuit 610 may identify duration of the synchronization signal of the second cellular communication from the information related to transmission of the synchronization signal of the second cellular communication. The first communication circuit 610 may configure the length of the measurement interval of the synchronization signal of the second cellular communication, based on the duration of the synchronization signal of the second cellular communication. For example, the first communication circuit 610 may identify subcarrier spacing related to transmission of the synchronization signal of the second cellular communication from the information related to transmission of the synchronization signal of the second cellular communication. Based on subcarrier spacing information related to transmission of the synchronization signal of the second cellular communication, the first communication circuit 610 may identify the transmission position (e.g., symbol position) of the synchronization signal of the second cellular communication and the length of the subcarrier in which the synchronization signal is transmitted. The first communication circuit 610 may configure the length of the measurement interval of the synchronization signal of the second cellular communication, based on the length of the subcarrier in which the synchronization signal is transmitted. For example, if the subcarrier spacing is 30 KHz, the synchronization signal of the second cellular communication may be transmitted through two subframes (e.g., about 2 ms). In this case, the first communication circuit 610 may configure the two subframes in which the synchronization signal is transmitted as the length of the measurement interval of the synchronization signal of the second cellular communication. For example, the first communication circuit 610 may configure the interval in which the synchronization signal of the second cellular communication is actually transmitted (e.g., four OFDM symbols) as the length of the measurement interval of the synchronization signal of the second cellular communication. For example, the interval in which the synchronization signal is actually transmitted may be configured based on subcarrier spacing information related to the transmission of the synchronization signal of the second cellular communication or based on reception information of the synchronization signal. For example, the information related to transmission of the synchronization signal of the second cellular communication may include the periodicity in which the synchronization signal of the second cellular communication is transmitted (e.g., SSB periodicity), an offset of the synchronization signal (e.g., an SSB offset), and/or the length of the interval for transmitting the synchronization signal (e.g., SSB duration).

According to an embodiment, if the information related to measurement of the synchronization signal of the second cellular communication is not received from the first node, the first communication circuit 610 may configure the measurement periodicity of the synchronization signal of the second cellular communication, based on the information related to transmission of the synchronization signal of the second cellular communication. For example, the first communication circuit 610 may identify the periodicity of the synchronization signal of the second cellular communication from the information related to transmission of the synchronization signal of the second cellular communication. The first communication circuit 610 may configure the measurement periodicity of the synchronization signal of the second cellular communication, based on the periodicity of the synchronization signal of the second cellular communication. As another example, the first communication circuit 610 may configure the measurement periodicity of the synchronization signal of the second cellular communication, based on scheduling request (SR) periodicity. As another example, the first communication circuit 610 may configure the measurement periodicity of the synchronization signal of the second cellular communication, based on operation state information of the electronic device 101. For example, the operation state information of the electronic device 101 may include at least one of the remaining battery capacity, the charging state, or the type of function (e.g., the service type) executed in the electronic device 101. For example, the first communication circuit 610 may receive the operation state information of the electronic device 101 from the processor 600.

According to various embodiments, the first communication circuit 610 may update the information related to measurement of the synchronization signal of the second cellular communication. According to an embodiment, the first communication circuit 610 may identify the measurement periodicity and/or interval of the synchronization signal of the second cellular communication by decoding the information related to measurement of the synchronization signal of the second cellular communication, which is received from the first node. The first communication circuit 610 may identify (or read) the periodicity and/or interval of the synchronization signal of the second cellular communication by decoding the information related to transmission of the synchronization signal of the second cellular communication, which is received from the first node. For example, if the periodicity and/or interval of the synchronization signal of the second cellular communication matches the measurement periodicity and/or interval of the synchronization signal of the second cellular communication, the first communication circuit 610 may measure the synchronization signals of the cells related to the second cellular communication, based on the measurement periodicity and/or interval of the synchronization signal, which is identified based on the information related to measurement of the synchronization signal of the second cellular communication received from the first node. As another example, if the periodicity and/or interval of the synchronization signal of the second cellular communication does not match the measurement periodicity and/or interval of the synchronization signal of the second cellular communication, the first communication circuit 610 update the measurement periodicity and/or interval of the synchronization signal, based on the periodicity and/or interval of the synchronization signal of the second cellular communication. According to an embodiment, if the scheduling request periodicity and/or interval matches the measurement periodicity and/or interval of the synchronization signal, the first communication circuit 610 may update the measurement periodicity and/or interval of the synchronization signal, based on the periodicity and/or interval of the synchronization signal of the second cellular communication and the scheduling request periodicity and/or interval. For example, if the scheduling request periodicity and/or interval does not match the measurement periodicity and/or interval of the synchronization signal, the first communication circuit 610 may measure the synchronization signals of the cells related to the second cellular communication, based on the measurement periodicity and/or interval of the synchronization signal, which is identified based on the information related to measurement of the synchronization signal of the second cellular communication received from the first node.

According to various embodiments, the first communication circuit 610 may adjust the measurement periodicity of the synchronization signal of the second cellular communication, based on the measurement result of the second cellular communication. According to an embodiment, the first communication circuit 610 may measure the synchronization signals of the cells related to the second cellular communication, based on first periodicity. For example, the first periodicity may include the measurement periodicity of the synchronization signal received from the first node or the measurement periodicity of the synchronization signal configured by the electronic device 101. If no synchronization signal of the cells related to the second cellular communication is detected in the first periodicity, the first communication circuit 610 may change the measurement periodicity of the synchronization signal of the second cellular communication into second periodicity. For example, the second periodicity may be configured to be greater than the first periodicity. For example, if no synchronization signal is detected through the measurement operation of the synchronization signal performed in the first periodicity, the first communication circuit 610 may change the measurement periodicity of the synchronization signal into the second periodicity, which is greater than the first periodicity, thereby reducing power consumption of the electronic device 101 for measuring the synchronization signal.

According to an embodiment, if no synchronization signal of the cells related to the second cellular communication is detected in the first periodicity, the first communication circuit 610 may adjust the measurement interval (or length of the interval) of the synchronization signal of the second cellular communication to be shorter.

According to various embodiments, in the state in which the communication connection based on the second cellular communication is not established in the network environment (e.g., the network environment 100A in FIG. 4A) capable of dual connectivity, the second communication circuit 620 may operate in an inactive state (or in a sleep state). According to an embodiment, the second communication circuit 620 may operate in the inactive state while the first communication circuit 610 periodically measures the synchronization signals of the cells related to the second cellular communication. For example, the inactive state of the second communication circuit 620 may include the state in which driving of the second communication circuit 620 is limited, even though power is supplied thereto, or the state in which the power supply to the second communication circuit 620 is limited.

According to various embodiments, in the case where the first communication circuit 610 performs measurement of synchronization signals of the cells related to the second cellular communication, reception of data transmitted through the first cellular communication from the first node and/or transmission of data to the first node through the first cellular communication may be limited. The first node (e.g., the MN 410) may transmit data to the electronic device 101 even when the first communication circuit 610 performs measurement of synchronization signals of the cells related to the second cellular communication. Accordingly, while the first communication circuit 610 performs measurement of synchronization signals of the cells related to the second cellular communication, the first node may fail to receive a response signal (e.g., ACK or NACK) to data transmitted to the electronic device 101. The first node and the first communication circuit 610 may perform retransmission (e.g., a hybrid automatic repeat request (HARQ)) for the data of which the response signal failed to be received by the first node. For example, when the measurement interval of the synchronization signals of the cells related to the second cellular communication ends, the first communication circuit 610 may perform retransmission for the data of which the response signal failed to be received by the first node. According to an embodiment, if the first node continuously fails to receive a response signal for the data transmitted to the electronic device 101 for a reference time, the first node may perform retransmission for the data of which the response signal failed to be received by the first node. According to an embodiment, if the data of which the response signal continuously failed to be received, among the data transmitted to the electronic device 101, exceeds specified conditions (e.g., ae reference number), the first node may perform retransmission for the data of which the response signal failed to be received. For example, based on the data retransmission of the first node, the first communication circuit 610 may receive the data retransmitted from the first node after the measurement interval of the synchronization signal of the cells related to the second cellular communication ends, thereby reducing data loss.

According to various embodiments, the processor 600 may control the first communication circuit 610 to perform measurement of the synchronization signal of the second cellular communication. According to an embodiment, the processor 600 may configure or update periodicity and/or an interval for performing the measurement of the synchronization signal of the second cellular communication by the first communication circuit 610.

Referring to FIG. 6B, the first communication circuit 610 and the second communication circuit 620 in FIG. 6A may be integrated into a single chip, which may be referred to as a third communication circuit 640. In this case, the third communication circuit 640 may include a first processing part 642 configured to perform substantially the same or a similar function as the first communication circuit 610 and a second processing part 644 configured to perform substantially the same or a similar function as the second communication circuit 620. For example, the third communication circuit 640 may perform first cellular communication with a first node (e.g., the MN 410 in FIG. 4A) using the first processing part 642 and a first radio frequency integrated circuit (RFIC) 652 (e.g., the first RFIC 222 and/or the first RFFE 232 in FIG. 2), and may perform second cellular communication with a second node (e.g., the SN 420 in FIG. 4A) using the second processing part 644 and a second RFIC 654 (e.g., the second RFIC 224 and/or the second RFFE 234 in FIG. 2).

For example, the third communication circuit 640 may perform measurement of synchronization signals of cells related to the second cellular communication using the first processing part 642. According to an embodiment, the processor 600 and the third communication circuit 640 may be implemented in a single chip or a single package. For example, the first processing part 642 and the second processing part 644 may be configured as software to process signals and protocols in different frequency bands from each other. For example, the first processing part 642 and the second processing part 644 may be configured as different circuits or different hardware from each other. For example, the first processing part 642 and the second processing part 644 may be portions that are logically distinguished (e.g., in software) therebetween. For example, the first processing part 642 in FIG. 6B may operate in the same manner as the first communication circuit 610 in FIG. 6A, and the second processing part 644 may operate in the same manner as the second communication circuit 620 in FIG. 6A. Accordingly, in order to avoid the same description made in FIG. 6A, detailed descriptions of the first processing part 642 and the second part 644 will be omitted.

According to an embodiment, the third communication circuit 640 may interact with the processor 600 through an AP2CP interface. For example, the AP2CP interface may include at least one of a shared memory type or a PCIE.

According to various embodiments, the electronic device 101 may perform measurement of synchronization signals of cells related to the second cellular communication using the first processing part 642 of the third communication circuit 640. In this case, since the second processing part 644 and the second RFIC 654 of the third communication circuit 640 operate in an inactive state (or a sleep state), it is possible to reduce current consumption of the third communication circuit 640 in relation to the measurement of synchronization signals of the cells related to the second cellular communication.

According to various example embodiments, an electronic device (e.g., the electronic device 101 in FIG. 1, 6A, or 6B) may include: a first communication circuit (e.g., the wireless communication module 192 in FIG. 1, the first communication circuit 610 in FIG. 6A, or the first processing part 642 of the third communication circuit 640 in FIG. 6B) configured to support a first cellular communication or a second cellular communication; and a second communication circuit (e.g., the wireless communication module 192 in FIG. 1, the second communication circuit 620 in FIG. 6A, or the second processing part 644 of the third communication circuit 640 in FIG. 6B) configured to support the second cellular communication, wherein the first communication circuit may be configured to: perform first cellular communication with a first node; based on information related to measurement of a synchronization signal of the second cellular communication not being received from the first node, identify information related to transmission of the synchronization signal of the second cellular communication; configure an interval related to measurement of the synchronization signal of the second cellular communication, based on the information related to transmission of the synchronization signal of the second cellular communication; and perform measurement of the synchronization signal of the second cellular communication in the interval related to measurement of the synchronization signal of the second cellular communication.

According to various example embodiments, the first communication circuit may be configured to receive the information related to transmission of the synchronization signal of the second cellular communication from the first node, based on a control message related to radio resource control (RRC).

According to various example embodiments, the information related to transmission of the synchronization signal of the second cellular communication may include information related to periodicity and/or duration regarding transmission of the synchronization signal of the second cellular communication.

According to various example embodiments, the first communication circuit may configure the measurement interval of the synchronization signal of the second cellular communication, based on the duration of the synchronization signal of the second cellular communication.

According to various example embodiments, the first communication circuit may configure the measurement interval of the synchronization signal of the second cellular communication, based on a partial interval, in which the synchronization signal is transmitted, in the duration of the synchronization signal of the second cellular communication.

According to various example embodiments, the first communication circuit may configure measurement periodicity of the synchronization signal of the second cellular communication, based on at least one of the periodicity of the synchronization signal of the second cellular communication, scheduling request periodicity, or an operation state of the electronic device.

According to various example embodiments, the operation state of the electronic device may include at least one of a battery state of the electronic device, a charging state of the electronic device, or a function that is being executed in the electronic device.

According to various example embodiments, the first communication circuit may be configured to stop the first cellular communication with the first node and perform measurement of the synchronization signal of the second cellular communication in the configured measurement interval.

According to various example embodiments, the second communication circuit may be configured to remain in an inactive state while the first communication circuit measures the synchronization signal of the second cellular communication.

According to various example embodiments, the first cellular communication may include at least one of a long-term evolution (LTE) network or a new radio (NR) network, and the second cellular communication may include an NR network or an LTE network.

According to various example embodiments, an electronic device (e.g., the electronic device 101 in FIG. 6A or 6B) may include: a first communication circuit (e.g., the wireless communication module 192 in FIG. 1, the first communication circuit 610 in FIG. 6A, or the first processing part 642 of the third communication circuit 640 in FIG. 6B) configured to support a first cellular communication or a second cellular communication; and a second communication circuit (e.g., the wireless communication module 192 in FIG. 1, the second communication circuit 620 in FIG. 6A, or the second processing part 644 of the third communication circuit 640 in FIG. 6B) configured to support the second cellular communication, wherein the first communication circuit may be configured to: perform first cellular communication with a first node; receive information related to measurement of a synchronization signal of the second cellular communication and information related to transmission of a synchronization signal of the second cellular communication from the first node; identify a measurement interval of the synchronization signal of the second cellular communication, based on the information related to measurement of the synchronization signal of the second cellular communication; identify a duration of the synchronization signal of the second cellular communication, based on the information related to transmission of the synchronization signal of the second cellular communication; based on the measurement interval of the synchronization signal of the second cellular communication not matching the duration, update the measurement interval of the synchronization signal of the second cellular communication, based on the duration of the synchronization signal of the second cellular communication; and perform measurement of the synchronization signal of the second cellular communication in the updated measurement interval.

Figure 7A:
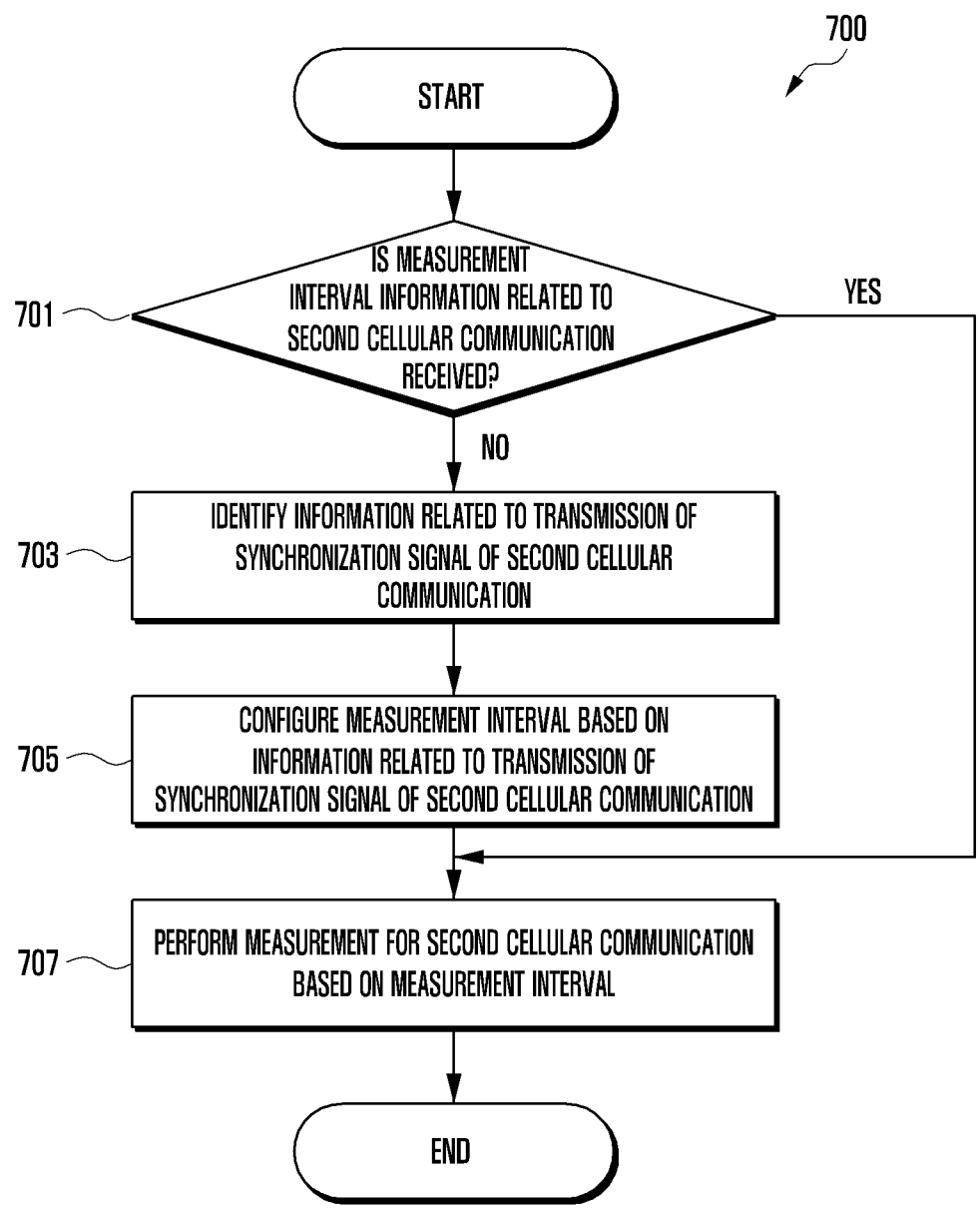
FIG. 7A is a flowchart illustrating an example method of configuring a measurement interval in an electronic device according to various embodiments.

FIG. 7A is a flowchart 700 illustrating an example method of configuring a measurement interval in an electronic device according to various embodiments. In the following example, respective operations may be performed in sequence, but may not necessarily be performed in sequence. For example, the sequence of the respective operations may be changed, and at least two operations may be performed in parallel. For example, the electronic device may be the electronic device 101 in FIG. 1, FIG. 6A, or FIG. 6B.

Referring to FIG. 7A, according to various embodiments, an electronic device (e.g., the wireless communication module 192 in FIG. 1, the first communication circuit 610 in FIG. 6A, or the third communication circuit 640 in FIG. 6B), in operation 701, may identify whether information related to measurement of a synchronization signal of the second cellular communication is received from a first node (e.g., the MN 410 in FIG. 4A) through the first cellular communication. According to an embodiment, the electronic device (e.g., the wireless communication module 192, the first communication circuit 610, or the third communication circuit 640) may identify whether the information related to measurement of the synchronization signal of the second cellular communication is included in an RRC message received from the first node. For example, the RRC message may include a control message related to reconfiguration of RRC (e.g., RRCreconfiguration or RRCconnectionreconfiguration). For example, the synchronization signal may include an SSB (SS/PBCH block).

According to various embodiments, if the information related to measurement of the synchronization signal of the second cellular communication is not received from the first node through the first cellular communication (e.g., "NO" in operation 701), in operation 703, the electronic device (e.g., the wireless communication module 192, the first communication circuit 610, or the third communication circuit 640) may identify information related to transmission of a synchronization signal of the second cellular communication (e.g., SMTC). According to an embodiment, the electronic device (e.g., the wireless communication module 192, the first communication circuit 610, or the third communication circuit 640) may identify the information related to transmission of the synchronization signal of the second cellular communication in an RRC message received from the first node. For example, the RRC message may include information related to measurement of a synchronization signal, information related to transmission of a synchronization signal, or information related to addition of the second cellular communication. For example, the information related to transmission of a synchronization signal of the second cellular communication may include information regarding periodicity and/or an interval of transmitting synchronization signals by the cells related to the second cellular communication. For example, as shown in Table 1 (e.g., 3GPP TS 36.331 standard) or Table 2 (e.g., 3GPP TS 38.331 standard), the first communication circuit 610 may identify duration (e.g., ssb-duration) and/or periodicity (e.g., periodicityandoffset) of a synchronization signal of the second cellular communication in an RRC message (e.g., RRCconnectionreconfiguration or RRCReconfiguration).

TABLE 1

```
MTC-SSB-NR-r15 ::= SEQUENCE {
    periodicityAndOffset-r15          CHOICE {
        sf5-r15               INTEGER (0..4),
        sf10-r15              INTEGER (0..9),
        sf20-r15              INTEGER (0..19),
        sf40-r15              INTEGER (0..39),
        sf80-r15              INTEGER (0..79),
        sf160-r15             INTEGER (0..159)
    },
    ssb-Duration-r15             ENUMERATED {sf1, sf2, sf3,
sf4, sf5}
}
```

TABLE 2

SSB-MTC information element

```
SSB-MTC ::= SEQUENCE {
    periodicityAndOffset              CHOICE {
        sf5                  INTEGER (0..4),
        sf10                 INTEGER (0..9),
        sf20                 INTEGER (0..19),
        sf40                 INTEGER (0..39),
        sf80                 INTEGER (0..79),
        sf160                INTEGER (0..159)
    },
    duration                     ENUMERATED {sf1, sf2, sf3,
sf4, sf5}
}
```

For example, the first communication circuit 610, as shown in Table 3 (e.g., 3GPP TS 38.331 standard) or Table 4 (e.g., 3GPP TS 36.331 standard), may identify subcarrier spacing related to the transmission of the synchronization signal of the second cellular communication in the RRC message.

TABLE 3

```
MeasObjectNR ::=                   SEQUENCE {
    ssbFrequency                   ARFCN-ValueNR
OPTIONAL, -- Cond SSBorAssociatedSSB
    ssbSubcarrierSpacing           SubcarrierSpacing
OPTIONAL, -- Cond SSBorAssociatedSSB
    smtc1                          SSB-MTC
OPTIONAL, -- Cond SSBorAssociatedSSB
    smtc2                          SSB-MTC2
OPTIONAL, -- Cond IntraFreqConnected
    refFreqCSI-RS                  ARFCN-ValueNR
OPTIONAL, -- Cond CSI-RS
    referenceSignalConfig
ReferenceSignalConfig,
    absThreshSS-BlocksConsolidation   ThresholdNR
OPTIONAL, -- Need R
    absThreshCSI-RS-Consolidation     ThresholdNR
OPTIONAL, -- Need R
    nrofSS-BlocksToAverage            INTEGER
(2..maxNrofSS-BlocksToAverage)
OPTIONAL, -- Need R
    nrofCSI-RS-ResourcesToAverage     INTEGER
(2..maxNrofCSI-RS-ResourcesToAverage)
OPTIONAL, -- Need R
    quantityConfigIndex               INTEGER
(1..maxNrofQuantityConfig),
    offsetMO                       Q-OffsetRangeList,
    cellsToRemoveList              PCI-List
OPTIONAL, -- Need N
    cellsToAddModList              CellsToAddModList
```

TABLE 3-continued

```
OPTIONAL, -- Need N
    blackCellsToRemoveList                PCI-RangeIndexList
OPTIONAL, -- Need N
    blackCellsToAddModList                SEQUENCE (SIZE
(1..maxNrofPCI-Ranges)) OF PCI-RangeElement
OPTIONAL, -- Need N
    whiteCellsToRemoveList                PCI-RangeIndexList
OPTIONAL, -- Need N
    whiteCellsToAddModList                SEQUENCE (SIZE
(1..maxNrofPCI-Ranges)) OF PCI-RangeElement
OPTIONAL, -- Need N
    ...,
    [[
freqBandIndicatorNR                       FreqBandIndicatorNR
OPTIONAL, -- Need R
    measCycleSCell                        ENUMERATED {sf160,
sf256, sf320, sf512, sf640, sf1024, sf1280} OPTIONAL
-- Need R
    ]]
}
```

TABLE 4

```
MeasObjectNR-r15 ::= SEQUENCE {
    carrierFreq-r15 ARFCN-ValueNR-r15,
    rs-ConfigSSB-r15 RS-ConfigSSB-NR-r15,
    threshRS-Index-r15 ThresholdListNR-r15 OPTIONAL, -
- Need OR
    maxRS-IndexCellQual-r15 MaxRS-IndexCellQualNR-r15
OPTIONAL, -- Need OR
    offsetFreq-r15 Q-OffsetRangeInterRAT DEFAULT 0,
    blackCellsToRemoveList-r15 CellIndexList OPTIONAL,
-- Need ON
    blackCellsToAddModList-r15 CellsToAddModListNR-r15
OPTIONAL, -- Need ON
    quantityConfigSet-r15 INTEGER (1.. maxQuantSetSNR-
r15),
    cellsForWhichToReportSFTD-r15 SEQUENCE (SIZE
(1..maxCellSFTD)) OF PhysCellIdNR-r15
    OPTIONAL, -- Need OR
                                    ...,
    [[ cellForWhichToReportCGI-r15 PhysCellIdNR-r15
OPTIONAL, -- Need ON
    deriveSSB-IndexFromCell-r15 BOOLEAN OPTIONAL, --
Need ON
    ss-RSSI-Measurement-r15 SS-RSSI-Measurement-r15
OPTIONAL, -- Need ON
    bandNR-r15 CHOICE {
    release NULL,
    setup FreqBandIndicatorNR-r15
} OPTIONAL -- Need ON
]]
}
    RS-ConfigSSB-NR-r15 ::= SEQUENCE {
    measTimingConfig-r15 MTC-SSB-NR-r15,
    subcarrierSpacingSSB-r15 ENUMERATED {kHz15, kHz30,
kHz120, kHz240},
```

According to various embodiments, in operation 705, based on the information related to transmission of the synchronization signal of the second cellular, the electronic device (e.g., the wireless communication module 192, the first communication circuit 610, or the third communication circuit 640) may configure an interval related to measurement of synchronization signals of cells related to the second cellular communication. According to an embodiment, based on the duration (e.g., ssb duration) of the synchronization signal of the second cellular communication, the electronic device (e.g., the wireless communication module 192, the first communication circuit 610, or the third communication circuit 640) may configure the length of a measurement interval of the synchronization signal of the second cellular communication. According to an embodiment, based on periodicity of the synchronization signal of the second cellular communication and/or a scheduling request periodicity, the first communication circuit 610 may configure measurement periodicity and/or a measurement interval of the synchronization signal of the second cellular communication.

According to various embodiments, if the interval related to measurement of the synchronization signal of the second cellular communication is configured (e.g., operation 705), the electronic device (e.g., the wireless communication module 192, the first communication circuit 610, or the third communication circuit 640), based on the interval related to measurement of synchronization signals of cells related to the second cellular communication, may perform measurement of the synchronization signal for the second cellular communication in operation 707. According to an embodiment, based on the interval related to measurement of synchronization signals of cells related to the second cellular communication configured in operation 705, the electronic device (e.g., the wireless communication module 192, the first communication circuit 610, or the third communication circuit 640) may perform measurement of the synchronization signals of the cells related to the second cellular communication in the measurement interval (or the measurement periodicity) of the synchronization signal. For example, the electronic device (e.g., the wireless communication module 192, the first communication circuit 610, or the third communication circuit 640) may stop the first cellular communication with the first node in the measurement interval of the synchronization signals of the cells related to the second cellular communication. For example, the electronic device (e.g., the wireless communication module 192, the first communication circuit 610, or the third communication circuit 640) may perform measurement of the synchronization signals of the cells related to the second cellular communication by changing the operating frequency to the frequency band corresponding to the second cellular communication in the measurement interval of the synchronization signals of the cells related to the second cellular communication.

According to various embodiments, if the information related to measurement of the synchronization signal of the second cellular communication is received from the first node through the first cellular communication (e.g., "YES" in operation 701), in operation 707, the electronic device (e.g., the wireless communication module 192, the first communication circuit 610, or the third communication circuit 640), based on the interval related to measurement of synchronization signals of cells related to the second cellular communication, may perform measurement of synchronization signals of the cells related to the second cellular communication. According to an embodiment, based on the interval related to measurement of synchronization signals of cells related to the second cellular communication received from the first node, the electronic device (e.g., the wireless communication module 192, the first communication circuit 610, or the third communication circuit 640) may perform measurement of synchronization signals of the cells related to the second cellular communication in the measurement interval (or the measurement periodicity) of the synchronization signals.

Figure 7B:
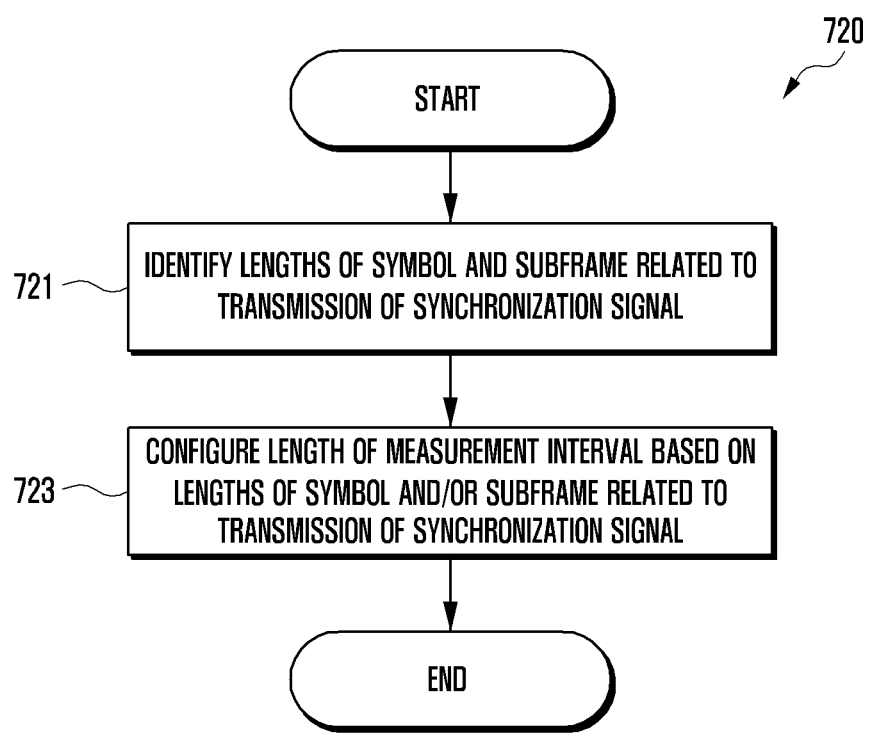
FIG. 7B is a flowchart illustrating an example method of configuring the length of a measurement interval in an electronic device according to various embodiments.
Figure 8A:
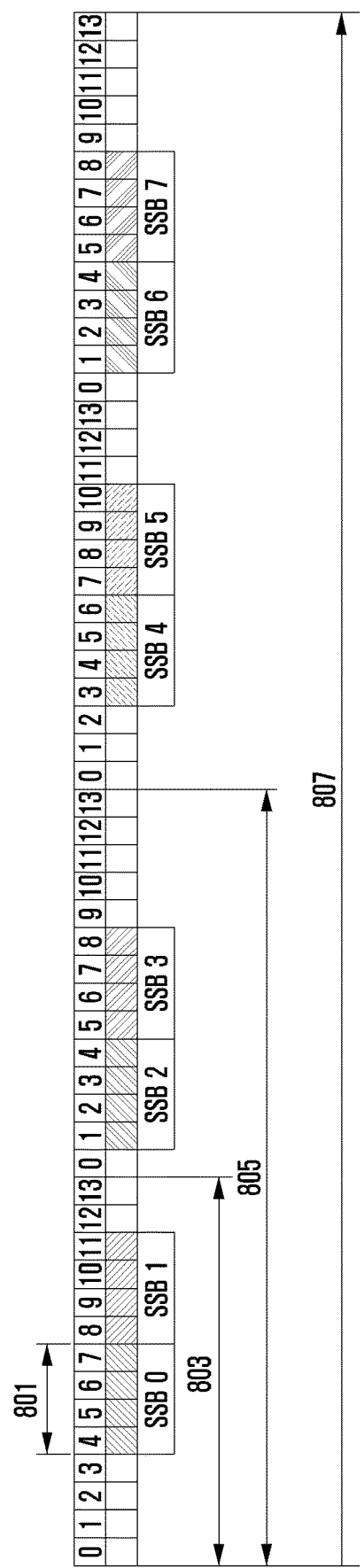
FIGS. 8A and 8B are diagrams illustrating example frame configurations related to configuration of the length of a measurement interval according to various embodiments.
Figure 8B:
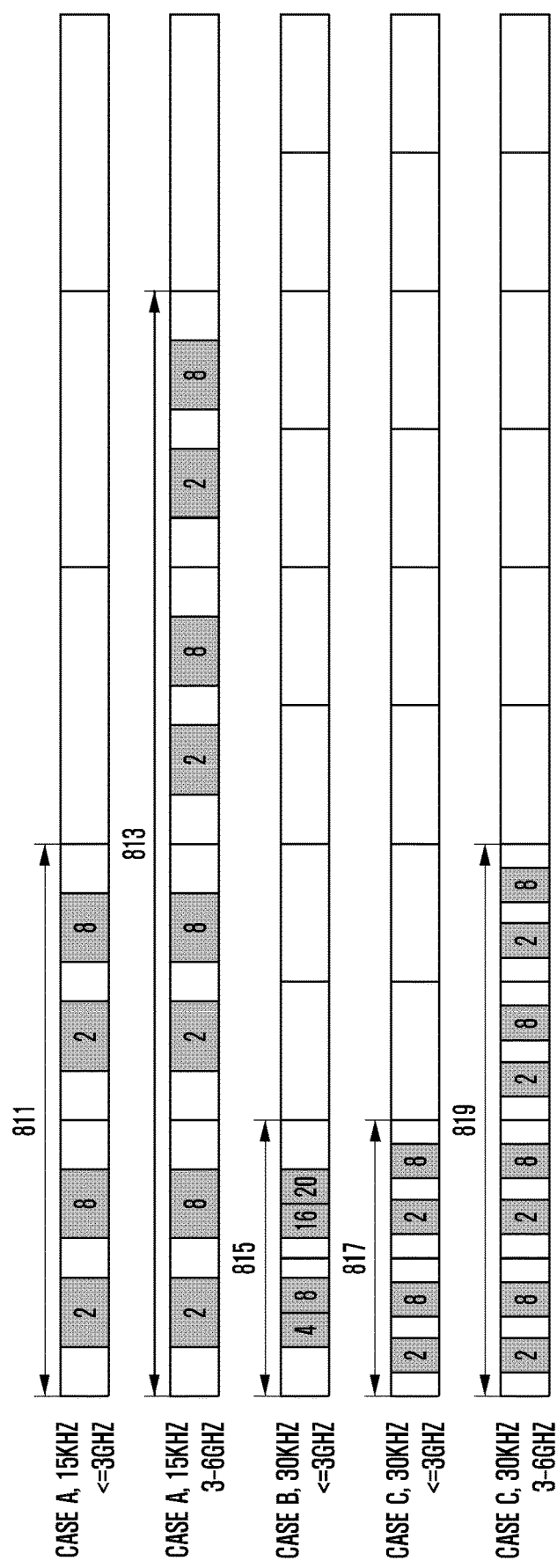

FIG. 7B is a flowchart illustrating an example method 720 of configuring the length of a measurement interval in an electronic device according to various embodiments. According to an embodiment, operations in FIG. 7B may include details of operation 705 in FIG. 7A. In the following example, respective operations may be performed in sequence, but may not necessarily be performed in sequence. For example, the sequence of the respective operations may be changed, and at least two operations may be performed in parallel. For example, the electronic device may be the electronic device 101 in FIG. 1, FIG. 6A, or FIG. 6B. For example, at least some configurations in FIG. 7B will be described with reference to FIGS. 8A and 8B. FIGS. 8A and 8B are diagrams illustrating example frame configurations related to configuration of the length of a measurement interval according to various embodiments.

Referring to FIG. 7B, according to various embodiments, if the information related to transmission of the synchronization signal of the second cellular communication is identified (e.g., operation 703 in FIG. 7A), in operation 721, the electronic device (e.g., the wireless communication module 192 in FIG. 1, the first communication circuit 610 in FIG. 6A, or the third communication circuit 640 in FIG. 6B), based on the information related to transmission of the synchronization signal of the second cellular communication, may identify the lengths of a symbol and/or a subframe related to transmission of the synchronization signal of the second cellular communication. According to an embodiment, the electronic device (e.g., the wireless communication module 192, the first communication circuit 610, or the third communication circuit 640), as shown in Table 3 or Table 4, may identify subcarrier spacing related to transmission of the synchronization signal of the second cellular communication in an RRC message. Based on subcarrier spacing related to transmission of the synchronization signal of the second cellular communication (e.g., communication related to the 3GPP TS 38.213 standard) as shown in Table 5, the electronic device (e.g., the wireless communication module 192, the first communication circuit 610, or the third communication circuit 640) may identify a start symbol of the synchronization signal and/or a subframe interval in which the synchronization signal is transmitted in the second cellular communication.

For example, referring to FIG. 8A, if the subcarrier spacing related to transmission of the synchronization signal is 30 KHz, and if the operating frequency is higher than 3 GHz, the synchronization signal of the second cellular communication may be transmitted through four symbols (e.g., OFDM symbols) 801 in every start symbol (e.g., 4, 8, 16, 20, 32, 36, 44, and 48) produced based on {4, 8, 16, 20}+28*n (n=0, 1) shown in case B in Table 5. Accordingly, the electronic device (e.g., the wireless communication module 192, the first communication circuit 610, or the third communication circuit 640) may determine two subframes 807 in which the synchronization signal of the second cellular communication is transmitted to be the duration of the synchronization signal (e.g., ssb duration) of the second cellular communication. For example, one subframe 805 may include two slots, and one slot 803 may include 14 symbols.

TABLE 5

Case A - 15 kHz SCS: the first symbols of the candidate SS/PBCH blocks have indexes of {2, 8} + 14 · n.
For operation without shared spectrum channel access:
For carrier frequencies smaller than or equal to 3 GHz, n = 0, 1.
For carrier frequencies within FR1 larger than 3 GHz, n = 0, 1, 2, 3.
For operation with shared spectrum channel access, as described in [15, TS 37.213], n = 0, 1, 2, 3, 4.
Case B - 30 kHz SCS: the first symbols of the candidate SS/PBCH blocks have indexes {4, 8, 16, 20} + 28 · n. For carrier frequencies smaller than or equal to 3 GHz, n = 0. For carrier frequencies within FR1 larger than 3 GHz, n = 0, 1.

TABLE 5-continued

Case C - 30 kHz SCS: the first symbols of the candidate SS/PBCH blocks have indexes {2, 8} + 14 · n.
For operation without shared spectrum channel access
For paired spectrum operation
For carrier frequencies smaller than or equal to 3 GHz, n = 0, 1. For carrier frequencies within FR1 larger than 3 GHz, n = 0, 1, 2, 3.
For unpaired spectrum operation
For carrier frequencies smaller than or equal to 2.4 GHz, n = 0, 1. For carrier frequencies within FR1 larger than 2.4 GHz, n = 0, 1, 2, 3.
For operation with shared spectrum channel access, n = 0, 1, 2, 3, 4, 5, 6, 7, 8, 9.

According to various embodiments, the electronic device (e.g., the wireless communication module 192, the first communication circuit 610, or the third communication circuit 640) may configure a measurement interval of the synchronization signal of the second cellular communication, based on the lengths of the symbol and/or the subframe for transmission of the synchronization signal in the second cellular communication in operation 723. According to an embodiment, referring to FIG. 8A, if the subcarrier spacing related to transmission of the synchronization signal is 30 KHz, and if the operating frequency is higher than 3 GHz (e.g., about 3 GHZ to 6 GHz) in case B in Table 5, the electronic device (e.g., the wireless communication module 192, the first communication circuit 610, or the third communication circuit 640) may configure two subframe intervals 803 in which synchronization signals (e.g., SSB0, SSB1, SSB2, SSB3, SSB4, SSB5, SSB6, and SSB7) are transmitted to be the interval (or the length of the interval) for measuring the synchronization signal of the second cellular communication.

According to an embodiment, referring to FIG. 8B, if the subcarrier spacing related to transmission of the synchronization signal is 15 KHz, and if the operating frequency is lower than 3 GHz in case A in Table 5, the electronic device (e.g., the wireless communication module 192, the first communication circuit 610, or the third communication circuit 640) may configure two subframe intervals 811 (e.g., about 2 ms) in which the synchronization signals are transmitted to be the interval (or the length of the interval) for measuring the synchronization signal of the second cellular communication.

According to an embodiment, referring to FIG. 8B, if the subcarrier spacing related to transmission of the synchronization signal is 15 KHz, and if the operating frequency is higher than 3 GHz (e.g., about 3 GHZ to 6 GHz) in case A in Table 5, the electronic device (e.g., the wireless communication module 192, the first communication circuit 610, or the third communication circuit 640) may configure four subframe intervals 813 (e.g., about 4 ms) in which the synchronization signals are transmitted to be the interval (or the length of the interval) for measuring the synchronization signal of the second cellular communication.

According to an embodiment, referring to FIG. 8B, if the subcarrier spacing related to transmission of the synchronization signal is 30 KHz, and if the operating frequency is lower than 3 GHz in case B in Table 5, the electronic device (e.g., the wireless communication module 192, the first communication circuit 610, or the third communication circuit 640) may configure one subframe interval 815 (e.g., about 1 ms) in which the synchronization signals are transmitted to be the interval (or the length of the interval) for measuring the synchronization signal of the second cellular communication.

According to an embodiment, referring to FIG. 8B, if the subcarrier spacing related to transmission of the synchronization signal is 30 KHz, and if the operating frequency is lower than 3 GHz in case C in Table 5, the electronic device (e.g., the wireless communication module 192, the first communication circuit 610, or the third communication circuit 640) may configure one subframe interval 817 (e.g., about 1 ms) in which the synchronization signals are transmitted to be the interval (or the length of the interval) for measuring the synchronization signal of the second cellular communication.

According to an embodiment, referring to FIG. 8B, if the subcarrier spacing related to transmission of the synchronization signal is 30 KHz, and if the operating frequency is higher than 3 GHz (e.g., about 3 GHZ to 6 GHz) in case C in Table 5, the electronic device (e.g., the wireless communication module 192, the first communication circuit 610, or the third communication circuit 640) may configure two subframe intervals 819 (e.g., about 2 ms) in which the synchronization signals are transmitted to be the interval (or the length of the interval) for measuring the synchronization signal of the second cellular communication.

According to various embodiments, the electronic device (e.g., the wireless communication module 192, the first communication circuit 610, or the third communication circuit 640) may configure the interval in which the synchronization signal is transmitted in the second cellular communication to be the interval (or the length of the interval) for measuring the synchronization signal of the second cellular communication.

According to an embodiment, referring to FIG. 8A, if the subcarrier spacing related to transmission of the synchronization signal is 30 KHz, and if the operating frequency is higher than 3 GHz (e.g., about 3 GHZ to 6 GHz) in case B in Table 5, the electronic device (e.g., the wireless communication module 192, the first communication circuit 610, or the third communication circuit 640) may configure the interval 801 of a first number (e.g., about 4) of symbols (e.g., about 0.25 ms) in which each of the synchronization signals (e.g., SSB0, SSB1, SSB2, SSB3, SSB4, SSB5, SSB6, or SSB7) is transmitted to be the interval (or the length of the interval) for measuring the synchronization signal of the second cellular communication.

Figure 9:
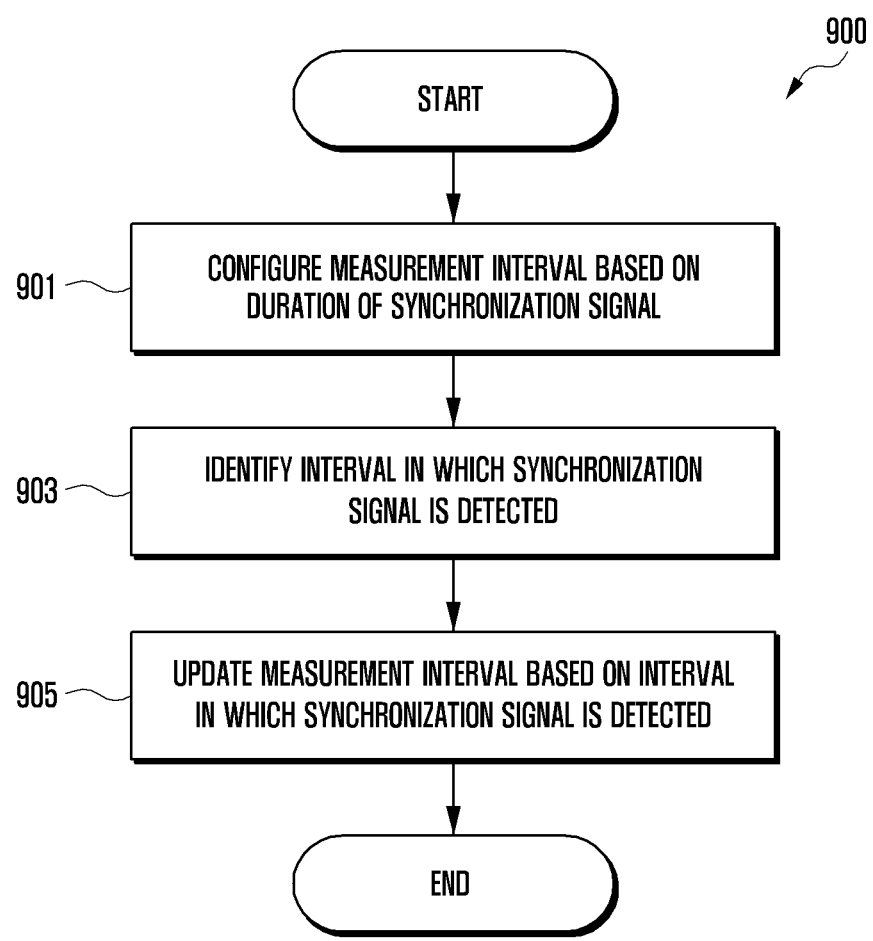
FIG. 9 is a flowchart another example method of configuring the length of a measurement interval in an electronic device according to various embodiments.
Figure 10:
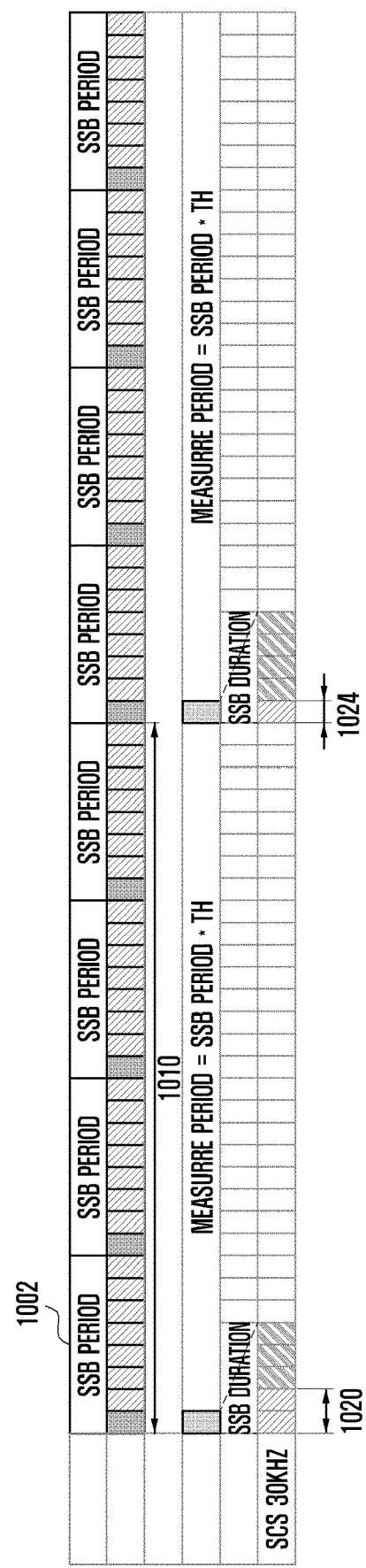
FIG. 10 is a diagram illustrating an example frame configuration including a measurement interval according to various embodiments.

FIG. 9 is a flowchart illustrating an example method 900 of configuring the length of a measurement interval in an electronic device according to various embodiments. According to an embodiment, operations in FIG. 9 may include details of operation 705 in FIG. 7A. In the following example, respective operations may be performed in sequence, but may not necessarily be performed in sequence. For example, the sequence of the respective operations may be changed, and at least two operations may be performed in parallel. For example, the electronic device may be the electronic device 101 in FIG. 1, FIG. 6A, or FIG. 6B. For example, at least some configurations in FIG. 9 will be described with reference to FIG. 10. FIG. 10 illustrates a frame configuration including a measurement interval according to various embodiments.

Referring to FIG. 9, according to various embodiments, if the information related to transmission of the synchronization signal of the second cellular communication is identified (e.g., operation 703 in FIG. 7A), the electronic device (e.g., the wireless communication module 192 in FIG. 1, the first communication circuit 610 in FIG. 6A, or the third communication circuit 640 in FIG. 6B) may configure the duration of the synchronization signal of the second cellular communication to be the interval (or the length of the interval) for measuring the synchronization signal of the second cellular communication in operation 901. According to an embodiment, the electronic device (e.g., the wireless communication module 192, the first communication circuit 610, or the third communication circuit 640), based on information related to the duration (e.g., ssb-duration) of the synchronization signal identified in the RRC message as shown in Table 1 or Table 2, may identify the duration of the synchronization signal of the second cellular communication. The electronic device (e.g., the wireless communication module 192, the first communication circuit 610, or the third communication circuit 640) may configure the duration of the synchronization signal of the second cellular communication to be the interval (or the length of the interval) for measuring the synchronization signal of the second cellular communication. For example, the information related to the duration of the synchronization signal (e.g., ssb-duration), which is included in the RRC message, may include information related to a subframe used in transmission of the synchronization signal (e.g., sf1, sf2, sf3, sf4, or sf5). For example, if the information related to the duration of the synchronization signal (e.g., ssb-duration) is configured as "sf1", the duration of the synchronization signal may be determined as including one subframe. As another example, if the information related to the duration of the synchronization signal (e.g., ssb-duration) is configured as "sf2", the duration of the synchronization signal may be determined as including two subframes.

According to an embodiment, the electronic device (e.g., the wireless communication module 192, the first communication circuit 610, or the third communication circuit 640), based on the subcarrier spacing related to transmission of the synchronization signal of the second cellular communication identified in the RRC message as shown in Table 3 or Table 4, may identify the duration of the synchronization signal of the second cellular communication. The electronic device (e.g., the wireless communication module 192, the first communication circuit 610, or the third communication circuit 640) may configure the duration of the synchronization signal of the second cellular communication to be the interval (or the length of the interval) for measuring the synchronization signal of the second cellular communication.

For example, referring to FIG. 10, if the subcarrier spacing related to transmission of the synchronization signal is 30 KHz, and if the operating frequency is higher than 3 GHz (e.g., about 3 GHZ to 6 GHz) in case B in Table 5, the electronic device (e.g., the wireless communication module 192, the first communication circuit 610, or the third communication circuit 640) may configure two subframe intervals (e.g., about 2 ms) in which the synchronization signal of the second cellular communication configured based on the periodicity 1002 of the synchronization signal is transmitted in each measurement periodicity 1010 to be the interval 1020 (or the length of the interval) for measuring the synchronization signal of the second cellular communication. For example, the measurement periodicity 1010 of the synchronization signal of the second cellular communication may correspond to multiples of the periodicity 1002 of the synchronization signal.

According to various embodiments, in operation 903, based on the interval for measuring the synchronization signal of the second cellular communication, the electronic device (e.g., the wireless communication module 192, the first communication circuit 610, or the third communication circuit 640) may perform measurement of synchronization signals of the second cellular communication, thereby identifying the interval in which the synchronization signal is detected among the intervals for measuring the synchronization signal of the second cellular communication. According to an embodiment, referring to FIG. 10, if the subcarrier spacing related to transmission of the synchronization signal is 30 KHz, and if the operating frequency is higher than 3 GHz (e.g., about 3 GHZ to 6 GHz) in case B in Table 5, the electronic device (e.g., the wireless communication module 192, the first communication circuit 610, or the third communication circuit 640) may perform measurement of the synchronization signal of the second cellular communication during the interval 1020 (or the length of the interval) for measuring the synchronization signal of the second cellular communication configured as the interval of two subframes (e.g., about 2 ms). The electronic device (e.g., the wireless communication module 192, the first communication circuit 610, or the third communication circuit 640) may identify the interval (e.g., 1024 in FIG. 10) in which the synchronization signal of the second cellular communication is actually detected in the interval 1020 (or the length of the interval) for measuring the synchronization signal of the second cellular communication.

According to various embodiments, in operation 905, the electronic device (e.g., the wireless communication module 192, the first communication circuit 610, or the third communication circuit 640), based on the interval in which the synchronization signal is detected, may update the interval (or the length of the interval) for measuring the synchronization signal of the second cellular communication. According to an embodiment, in FIG. 10, the electronic device (e.g., the wireless communication module 192, the first communication circuit 610, or the third communication circuit 640) may detect synchronization signals 1010 through one subframe in the interval 1020 for measuring the synchronization signal of the second cellular communication. The first communication circuit 610 may update the interval of one subframe in which the synchronization signal is detected with the interval 1024 (or the length of the interval) for measuring the synchronization signal of the second cellular communication. For example, the first communication circuit 610 may perform measurement of synchronization signal of the second cellular communication, based on the interval 1024 (or the length of the interval) for measuring the updated synchronization signal of the second cellular communication.

Figure 11:
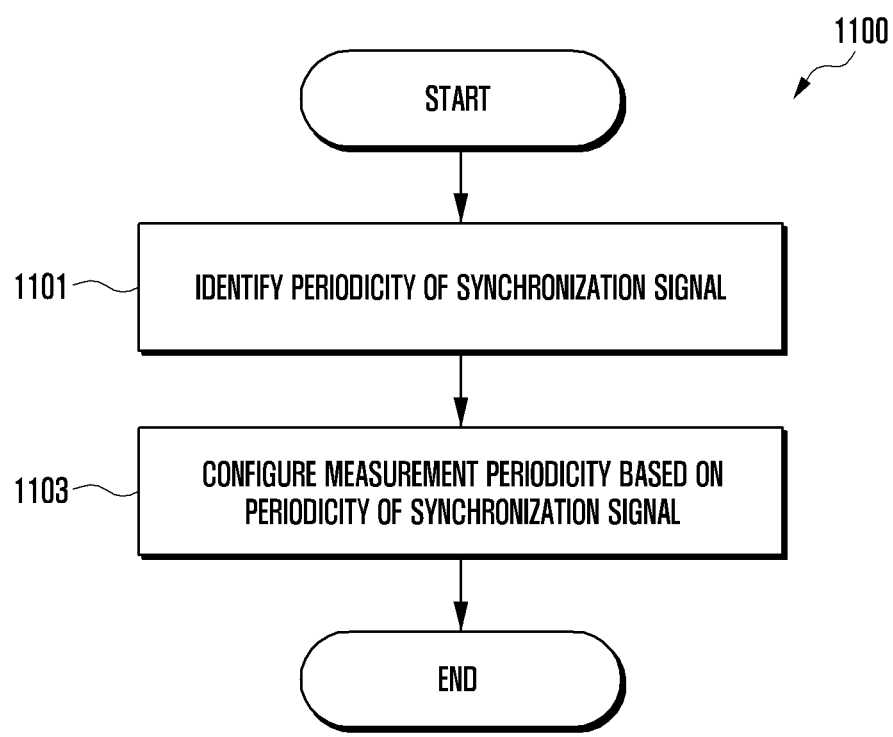
FIG. 11 is a flowchart illustrating an example method of configuring measurement periodicity in an electronic device according to various embodiments.
Figure 12:
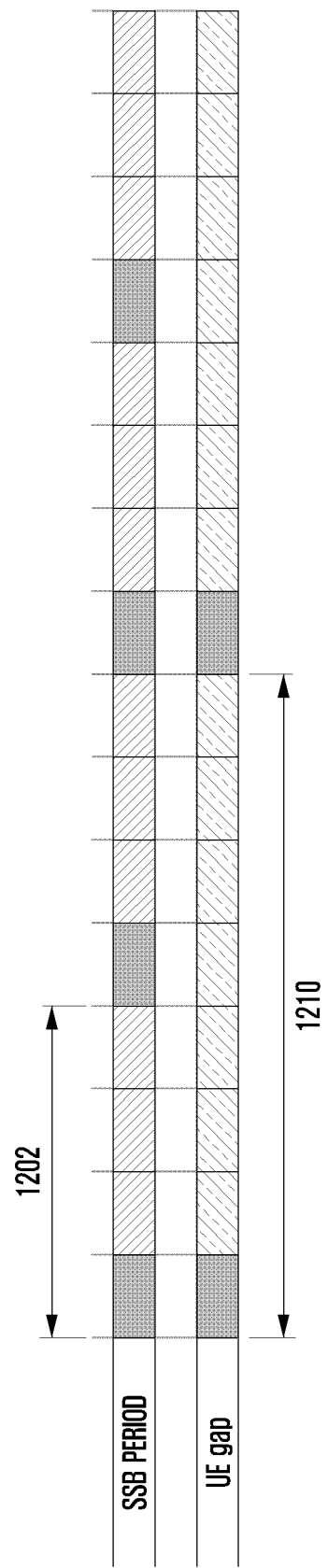
FIG. 12 is a diagram illustrating an example frame configuration related to configuration of measurement periodicity according to various embodiments.

FIG. 11 is a flowchart 1100 illustrating an example method of configuring measurement periodicity in an electronic device according to various embodiments. According to an embodiment, operations in FIG. 11 may include details of operation 703 and operation 705 in FIG. 7A. In the following example, respective operations may be performed in sequence, but may not necessarily be performed in sequence. For example, the sequence of the respective operations may be changed, and at least two operations may be performed in parallel. For example, the electronic device may be the electronic device 101 in FIG. 1, FIG. 6A, or FIG. 6B. For example, at least some configurations in FIG. 11 will be described with reference to FIG. 12. FIG. 12 illustrates a frame configuration related to configuration of measurement periodicity according to various embodiments.

Referring to FIG. 11, according to various embodiments, the electronic device (e.g., the wireless communication module 192 in FIG. 1, the first communication circuit 610 in FIG. 6A, or the third communication circuit 640 in FIG. 6B) may identify periodicity of the synchronization signal of the second cellular communication in operation 1101. According to an embodiment, the electronic device (e.g., the wireless communication module 192, the first communication circuit 610, or the third communication circuit 640), based on information related to the periodicity of the synchronization signal of the second cellular communication (e.g., periodicityandoffset) included in an RRC message as shown in Table 1 or Table 2, may identify the periodicity of the synchronization signal of the second cellular communication. For example, the information related to the periodicity of synchronization signal of the second cellular communication (e.g., periodicityandoffset) included in the RRC message may include information related to the subframe interval (e.g., sf5, sf10, sf20, sf40, sf80, or sf160) in which the synchronization signals are transmitted. For example, if the information related to the periodicity of the synchronization signal (e.g., periodicityandoffset) is configured as "sf5", the periodicity of the synchronization signal may be determined to be configured as five subframes. As another example, if the information related to the periodicity of the synchronization signal (e.g., periodicityandoffset) is configured as "sf10", the duration of the synchronization signal may be determined to be configured as ten subframes.

According to various embodiments, in operation 1103, the electronic device (e.g., the wireless communication module 192, the first communication circuit 610, or the third communication circuit 640), based on the periodicity of the synchronization signal of the second cellular communication, may configure the measurement periodicity of the synchronization signal of the second cellular communication.

According to an embodiment, referring to FIG. 12, the electronic device (e.g., the wireless communication module 192, the first communication circuit 610, or the third communication circuit 640) may configure the measurement periodicity 1210 (UE gap) of the synchronization signal of the second cellular communication to match at least a partial time interval included in the periodicity 1202 of the synchronization signal of the second cellular communication.

Figure 13:
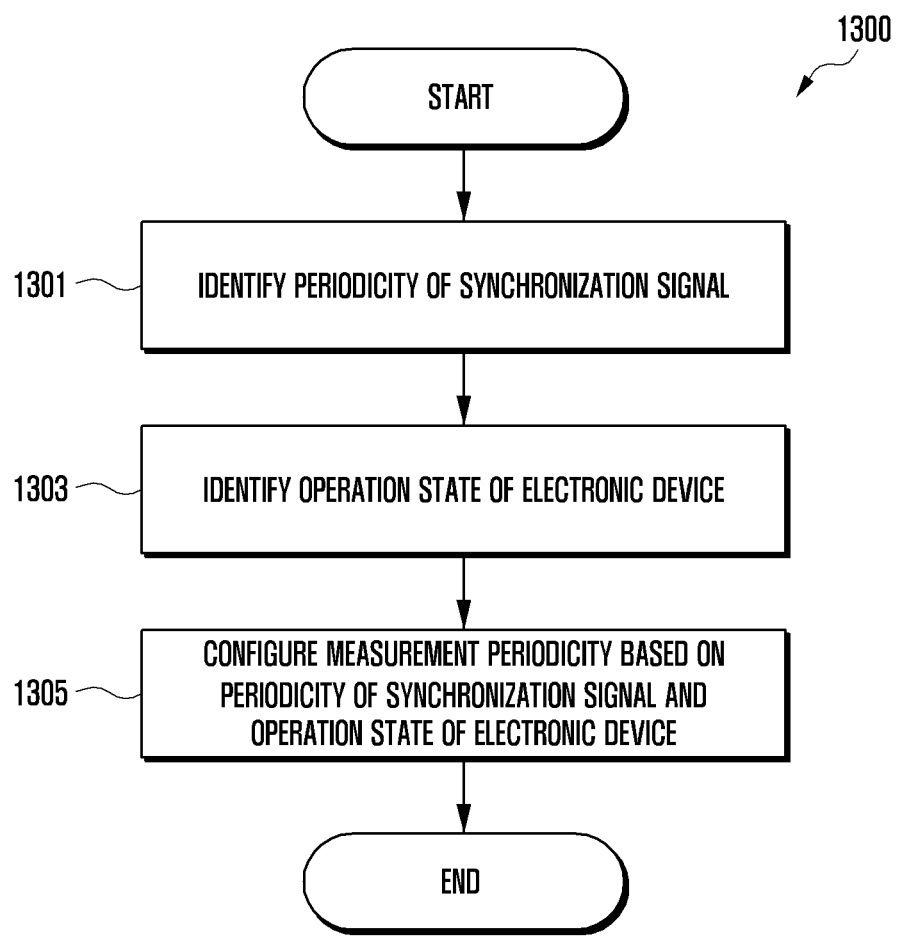
FIG. 13 is a flowchart illustrating an example method of configuring measurement periodicity, based on the operation state of an electronic device in an electronic device according to various embodiments.
Figure 14A:
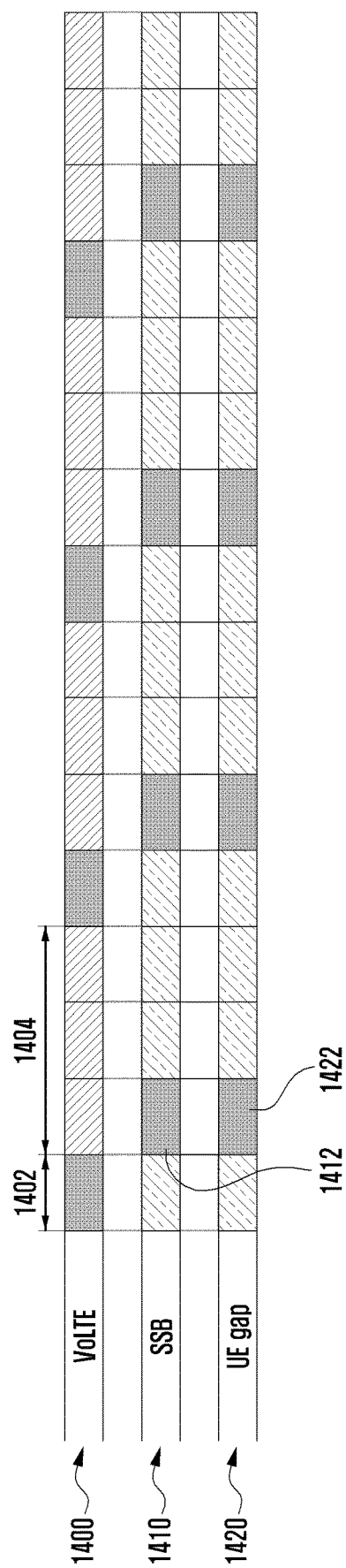
FIGS. 14A and 14B are diagrams illustrating example frame configurations including measurement periodicity configured based on the operation state of an electronic device according to various embodiments.
Figure 14B:
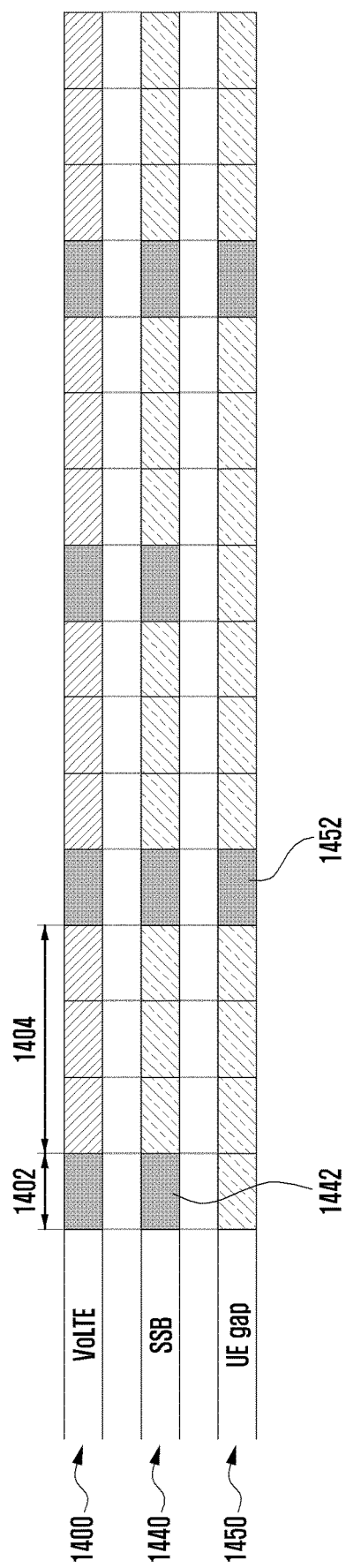

FIG. 13 is a flowchart 1300 illustrating an example method of configuring measurement periodicity, based on the operation state of an electronic device in an electronic device according to various embodiments. According to an embodiment, operations in FIG. 13 may include details of operations 703 and operation 705 in FIG. 7A. In the following example, respective operations may be performed in sequence, but may not necessarily be performed in sequence. For example, the sequence of the respective operations may be changed, and at least two operations may be performed in parallel. For example, the electronic device may be the electronic device 101 in FIG. 1, FIG. 6A, or FIG. 6B. For example, at least some configurations in FIG. 13 will be described with reference to FIGS. 14A and 14B. FIGS. 14A and 14B illustrate frame configurations including measurement periodicity configured based on the operation state of an electronic device according to various embodiments.

Referring to FIG. 13, according to various embodiments, the electronic device (e.g., the wireless communication module 192 in FIG. 1, the first communication circuit 610 in FIG. 6A, or the third communication circuit 640 in FIG. 6B) may identify periodicity of the synchronization signal of the second cellular communication in operation 1301. According to an embodiment, as shown in Table 1 or Table 2, the first communication circuit 610 may identify the periodicity (e.g., periodicityandoffset) of the synchronization signal of the second cellular communication in the RRC message.

According to various embodiments, the electronic device (e.g., the wireless communication module 192, the first communication circuit 610, or the third communication circuit 640) may identify the operation state of the electronic device 101 in operation 1303. For example, the operation state of the electronic device 101 may include at least one of location information of the electronic device 101, movement information of the electronic device 101, the remaining battery power, charging status, or the type of function (e.g., service type) performed by the electronic device 101.

According to various embodiments, in operation 1305, the electronic device (e.g., the wireless communication module 192, the first communication circuit 610, or the third communication circuit 640), based on the periodicity of the synchronization signal of the second cellular communication and the operation state of the electronic device 101, may configure the measurement periodicity of the synchronization signal of the second cellular communication. According to an embodiment, if the remaining battery power of the electronic device 101 exceeds a specified value, or if power is supplied from an external electronic device, the electronic device (e.g., the wireless communication module 192, the first communication circuit 610, or the third communication circuit 640) may configure the measurement periodicity of the synchronization signal of the second cellular communication as a third periodicity in which at least a partial time interval included in the periodicity 1202 of the synchronization signal of the second cellular communication matches. According to an embodiment, if the remaining battery power of the electronic device 101 is less than or equal to the specified value, or if no power is supplied from an external electronic device, the electronic device (e.g., the wireless communication module 192, the first communication circuit 610, or the third communication circuit 640) may configure the measurement periodicity of the synchronization signal of the second cellular communication as a fourth periodicity in which at least a partial interval included in the periodicity 1202 of the synchronization signal of the second cellular communication matches. For example, the fourth periodicity may be configured to be greater than the third periodicity.

According to an embodiment, if a real-time service {e.g., voice of long-term evolution (VoLTE)} using the first cellular communication is provided in the electronic device 101, the electronic device (e.g., the wireless communication module 192, the first communication circuit 610, or the third communication circuit 640), based on the periodicity of the synchronization signal of the second cellular communication and the operation state of the electronic device 101, may configure the measurement periodicity of the synchronization signal of the second cellular communication.

For example, referring to FIG. 14A, in the case where VoLTE services are provided (1400), the electronic device (e.g., the wireless communication module 192, the first communication circuit 610, or the third communication circuit 640) may transmit and/or receive data related to VoLTE (e.g., VoLTE real-time transport protocol (RTP) data) in a fifth periodicity (e.g., about 40 ms or 20 ms) in the transmission/reception interval 1402. If the duration 1412 of the synchronization signal of the second cellular communication is included in the interval 1404 in which data related to VoLTE is not transmitted/received (1410), the electronic device (e.g., the wireless communication module 192, the first communication circuit 610, or the third communication circuit 640) may configure the measurement interval 1422 of the synchronization signal of the second cellular communication to match at least a portion of the duration 1412 of the synchronization signal of the second cellular communication (1420). For example, the measurement interval 1422 of the synchronization signal of the second cellular communication may be configured as the fifth periodicity for each interval 1404 in which data related to VoLTE is not transmitted/received.

For example, referring to FIG. 14B, if the duration 1442 of the synchronization signal of the second cellular communication is included in the interval (1402) in which data related to VoLTE is transmitted/received (1440), the electronic device (e.g., the wireless communication module 192, the first communication circuit 610, or the third communication circuit 640) may configure the measurement interval 1452 of the synchronization signal of the second cellular communication as a sixth periodicity in which at least a portion of the time interval included in the duration 1442 of the synchronization signal of the second cellular communication matches (1450). For example, the sixth periodicity may be configured to be greater in order to reduce the loss of data packets related to VoLTE. According to various embodiments, the electronic device (e.g., the wireless communication module 192, the first communication circuit 610, or the third communication circuit 640) may configure the measurement periodicity of the synchronization signal of the second cellular communication as greater periodicity in order to reduce the packet loss of the first cellular communication. For example, in the case where the periodicity of the synchronization signal of the second cellular communication is identified, the measurement periodicity of the synchronization signal of the second cellular communication may configure as greater periodicity than the periodicity of the synchronization signal defined in the second cellular communication in order to reduce the packet loss of the second cellular communication.

Figure 15:
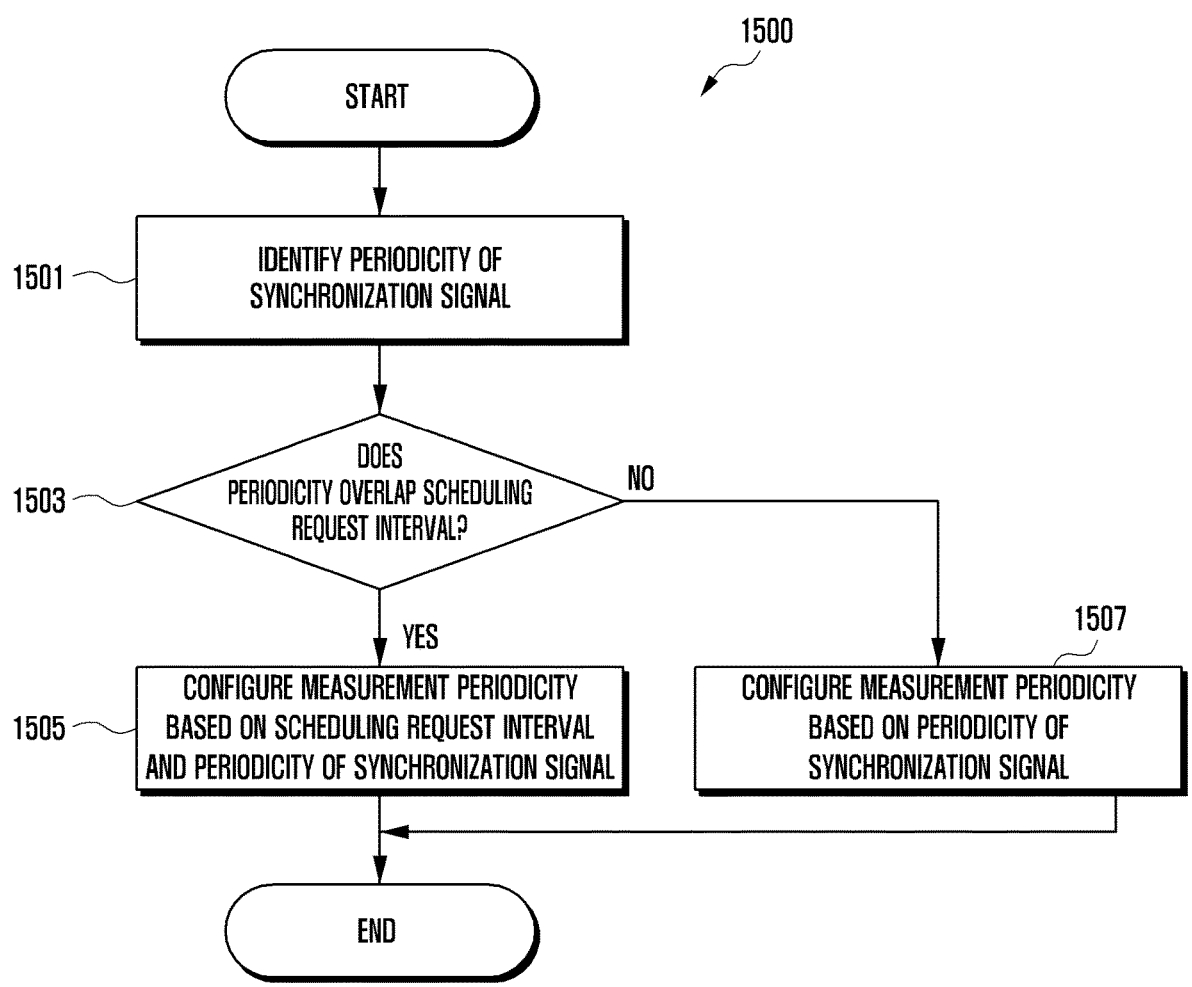
FIG. 15 is a flowchart illustrating an example method of configuring measurement periodicity, based on a scheduling request interval in an electronic device according to various embodiments.
Figure 16:
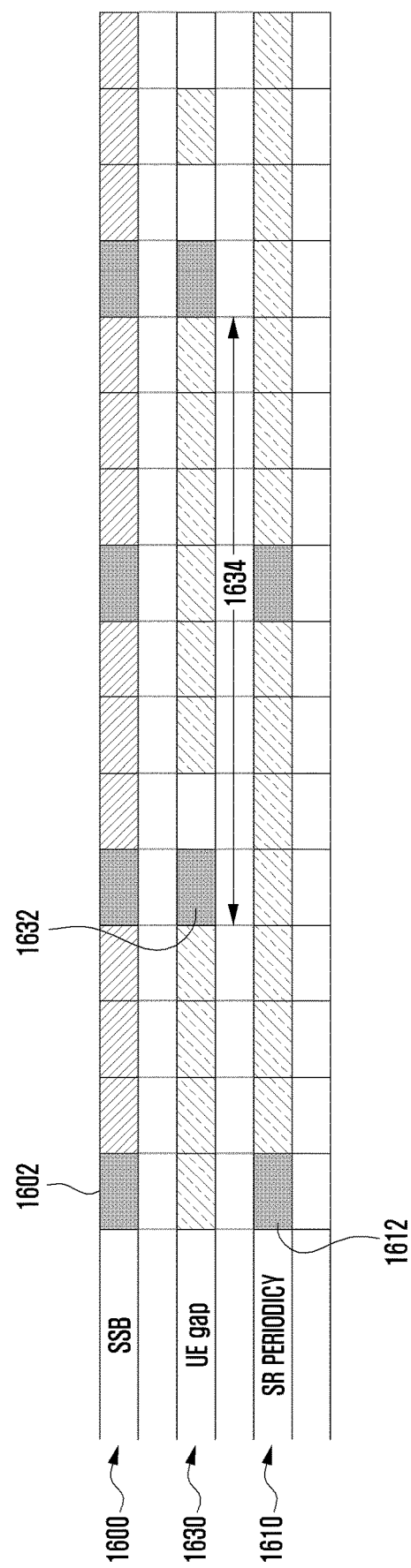
FIG. 16 is a diagram illustrating an example frame configuration including measurement periodicity configured based on a scheduling request interval according to various embodiments.

FIG. 15 is a flowchart 1500 illustrating an example method of configuring measurement periodicity, based on a scheduling request interval in an electronic device according to various embodiments. According to an embodiment, operations in FIG. 15 may include details of operation 705 in FIG. 7A. In the following example, respective operations may be performed in sequence, but may not necessarily be performed in sequence. For example, the sequence of the respective operations may be changed, and at least two operations may be performed in parallel. For example, the electronic device may be the electronic device 101 in FIG. 1, FIG. 6A, or FIG. 6B. For example, at least some configurations in FIG. 15 will be described with reference to FIG. 16. FIG. 16 illustrates a frame configuration including measurement periodicity configured based on a scheduling request interval according to various embodiments.

Referring to FIG. 15, according to various embodiments, the electronic device (e.g., the wireless communication module 192 in FIG. 1, the first communication circuit 610 in FIG. 6A, or the third communication circuit 640 in FIG. 6B) may identify the periodicity of the synchronization signal of the second cellular communication in operation 1501. According to an embodiment, the electronic device (e.g., the wireless communication module 192, the first communication circuit 610, or the third communication circuit 640) may identify the periodicity of the synchronization signal of the second cellular communication (e.g., periodicityandoffset) in an RRC message, as shown in Table 1 or Table 2.

According to various embodiments, the electronic device (e.g., the wireless communication module 192, the first communication circuit 610, or the third communication circuit 640) may identify whether the periodicity of the synchronization signal of the second cellular communication overlaps the scheduling request periodicity in operation 1503. According to an embodiment, the electronic device (e.g., the wireless communication module 192, the first communication circuit 610, or the third communication circuit 640) may identify information related to the scheduling request periodicity (e.g., sr-ConfigIndex) in the RRC message, as shown in Table 6 (e.g., 3GPP TS36.331 standard). For example, the electronic device (e.g., the wireless communication module 192, the first communication circuit 610, or the third communication circuit 640) may identify the scheduling request periodicity (e.g., SR periodicity) corresponding to the information related to the scheduling request periodicity from a predefined table (e.g., 3GPP TS36.213 table 10.1.5-1), as shown in Table 7.

TABLE 6

```
SchedulingRequestConfig ::=        CHOICE {
    release              NULL,
    setup           SEQUENCE {
       sr-PUCCH-ResourceIndex       INTEGER (0..2047),
       sr-ConfigIndex               INTEGER (0..157),
       dsr-TransMax                 ENUMERATED {
                     n4, n8, n16, n32, n64,
spare3, spare2, spare1}
    }
}
```

TABLE 7

| SR configuration Index $I_{SR}$ | SR periodicity (ms) $SR_{PERIODICITY}$ | SR subframe offset $N_{OFFSET, SR}$ |
|---|---|---|
| 0-4 | 5 | $I_{SR}$ |
| 5-14 | 10 | $I_{SR}$-5 |
| 15-34 | 20 | $I_{SR}$-15 |
| 35-74 | 40 | $I_{SR}$-35 |
| 75-154 | 80 | $I_{SR}$-75 |
| 155-156 | 2 | $I_{SR}$-155 |
| 157 | 1 | $I_{SR}$-157 |

According to various embodiments, if the periodicity of the synchronization signal of the second cellular communication overlaps the scheduling request periodicity (e.g., "YES" in operation 1503), in operation 1505, the electronic device (e.g., the wireless communication module 192, the first communication circuit 610, or the third communication circuit 640), based on the periodicity of the synchronization signal of the second cellular communication and the scheduling request periodicity, may configure the measurement periodicity of the synchronization signal of the second cellular communication. According to an embodiment, referring to FIG. 16, if the duration 1602 of the synchronization signal (e.g., the SSB) of the second cellular communication overlaps at least a portion of the scheduling request interval 1612 (1610), the electronic device (e.g., the wireless communication module 192, the first communication circuit 610, or the third communication circuit 640) may configure the measurement periodicity 1634 of a reference signal of the second cellular communication such that the measurement interval 1632 of the synchronization signal of the second cellular communication matches (1630) at least a portion of the duration 1602 of the synchronization signal (e.g., the SSB) of the second cellular communication but does not overlap the scheduling request interval 1612.

According to various embodiments, if the periodicity of the synchronization signal of the second cellular communication does not overlap the scheduling request periodicity (e.g., "NO" in operation 1503), in operation 1507, the electronic device (e.g., the wireless communication module 192, the first communication circuit 610, or the third communication circuit 640) may configure the measurement periodicity of the synchronization signal of the second cellular communication, based on the periodicity of the synchronization signal of the second cellular communication.

Figure 17:
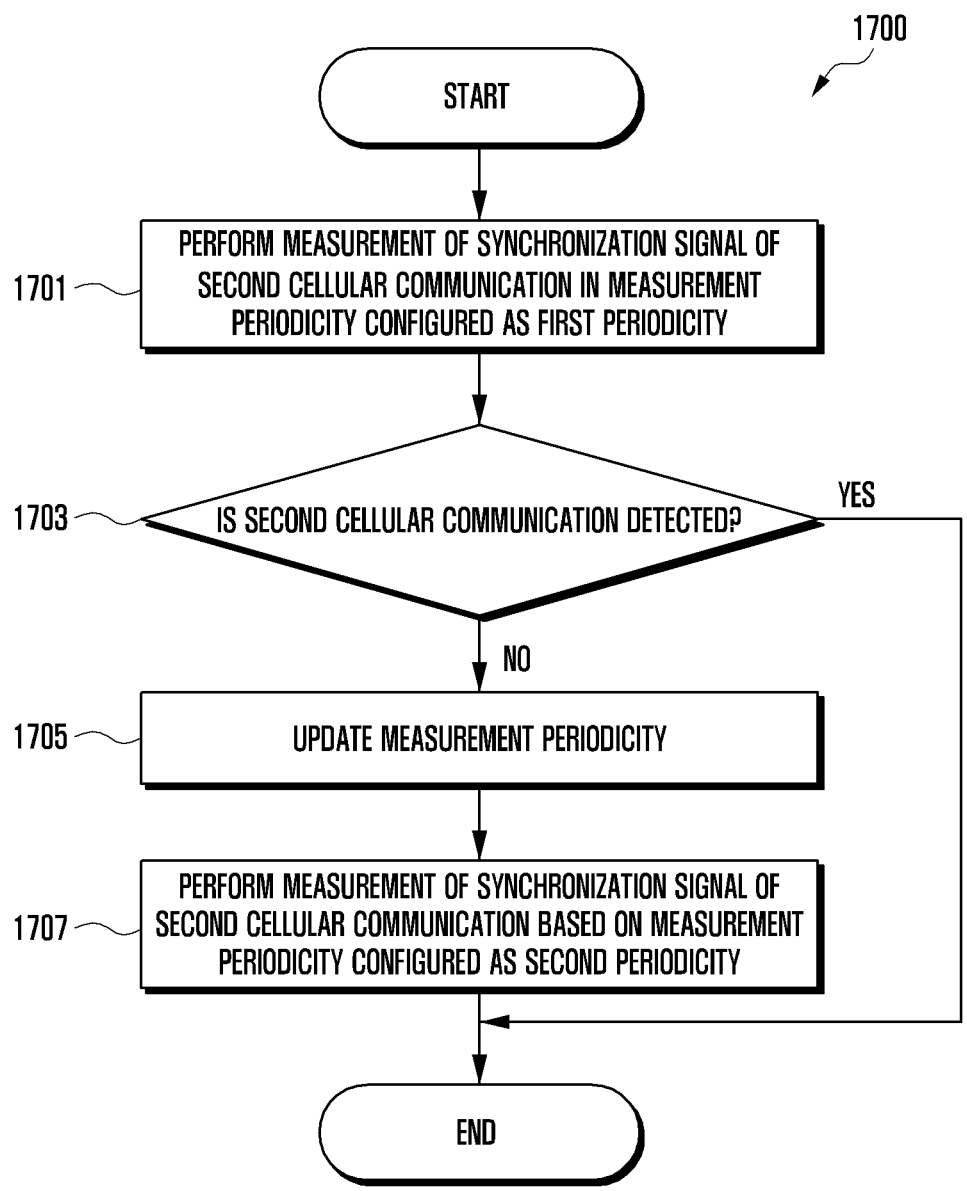
FIG. 17 is a flowchart illustrating an example method of updating measurement periodicity in an electronic device according to various embodiments.

FIG. 17 is a flowchart 1700 illustrating an example method of updating measurement periodicity in an electronic device according to various embodiments. In the following example, respective operations may be performed in sequence, but may not necessarily be performed in sequence. For example, the sequence of the respective operations may be changed, and at least two operations may be performed in parallel. For example, the electronic device may be the electronic device 101 in FIG. 1, FIG. 6A, or FIG. 6B.

Referring to FIG. 17, according to various embodiments, the electronic device (e.g., the wireless communication module 192 in FIG. 1, the first communication circuit 610 in FIG. 6A, or the third communication circuit 640 in FIG. 6B) may perform measurement of the synchronization signal of the second cellular communication in the measurement periodicity of a reference signal of the second cellular communication configured as the first periodicity (e.g., about 80 ms) in operation 1701. According to an embodiment, as shown in Table 8 (e.g., 3GPP TS 36.331 or TS 38.331 standard), the electronic device (e.g., the wireless communication module 192, the first communication circuit 610, or the third communication circuit 640) may configure the first periodicity, based on the measurement periodicity (e.g., gapoffset) of the synchronization signal in an RRC message (e.g., RRCconnectionreconfiguration).

TABLE 8

```
MeasGapConfig ::=               CHOICE {
    release              NULL,
    setupSEQUENCE {
       gapOffset                   CHOICE {
          gp0                      INTEGER (0..39),
          gp1                      INTEGER (0..79),
```

According to an embodiment, the electronic device (e.g., the wireless communication module 192, the first communication circuit 610, or the third communication circuit 640), as shown in operation 1101 to operation 1103 in FIG. 11, may configure the first periodicity, based on the periodicity of the synchronization signal of the second cellular communication. According to an embodiment, as shown in operation 1301 to operation 1305 in FIG. 13, the electronic device (e.g., the wireless communication module 192, the first communication circuit 610, or the third communication circuit 640) may configure the first periodicity, based on the periodicity of the synchronization signal of the second cellular communication and the operation state of the electronic device 101. According to an embodiment, the electronic device (e.g., the wireless communication module 192, the first communication circuit 610, or the third communication circuit 640), as shown in operation 1501 to operation 1505 in FIG. 15, may configure the first periodicity, based on the periodicity of the synchronization signal of the second cellular communication and the scheduling request periodicity.

According to various embodiments, the electronic device (e.g., the wireless communication module 192, the first communication circuit 610, or the third communication circuit 640) may identify whether a cell (e.g., an NR cell) related to the second cellular communication is detected through the measurement of the synchronization signal of the second cellular communication in operation 1703.

According to various embodiments, if the cell related to the second cellular communication is not detected (e.g., "NO" in operation 1703), in operation 1705, the electronic device (e.g., the wireless communication module 192, the first communication circuit 610, or the third communication circuit 640) may update the measurement periodicity of the synchronization signal of the second cellular communication with the second periodicity (e.g., about 160 ms), which is different from the first periodicity. According to an embodiment, the second periodicity may be configured to be greater than the first periodicity.

According to various embodiments, in operation 1707, based on the measurement periodicity of the synchronization signal of the second cellular communication configured as the second periodicity, the electronic device (e.g., the wireless communication module 192, the first communication circuit 610, or the third communication circuit 640) may perform measurement of the synchronization signal of the second cellular communication. For example, the electronic device (e.g., the wireless communication module 192, the first communication circuit 610, or the third communication circuit 640) may change the measurement periodicity of the synchronization signal of the second cellular communication to the second periodicity, which is greater than the first periodicity, thereby reducing power consumption of the electronic device 101 due to the measurement of the synchronization signal.

According to various embodiments, if the cell related to the second cellular communication is detected (e.g., "YES" in operation 1703), the electronic device (e.g., the wireless communication module 192, the first communication circuit 610, or the third communication circuit 640) may transmit a measurement result of the synchronization signal of the second cellular communication to the first node.

Figure 18:
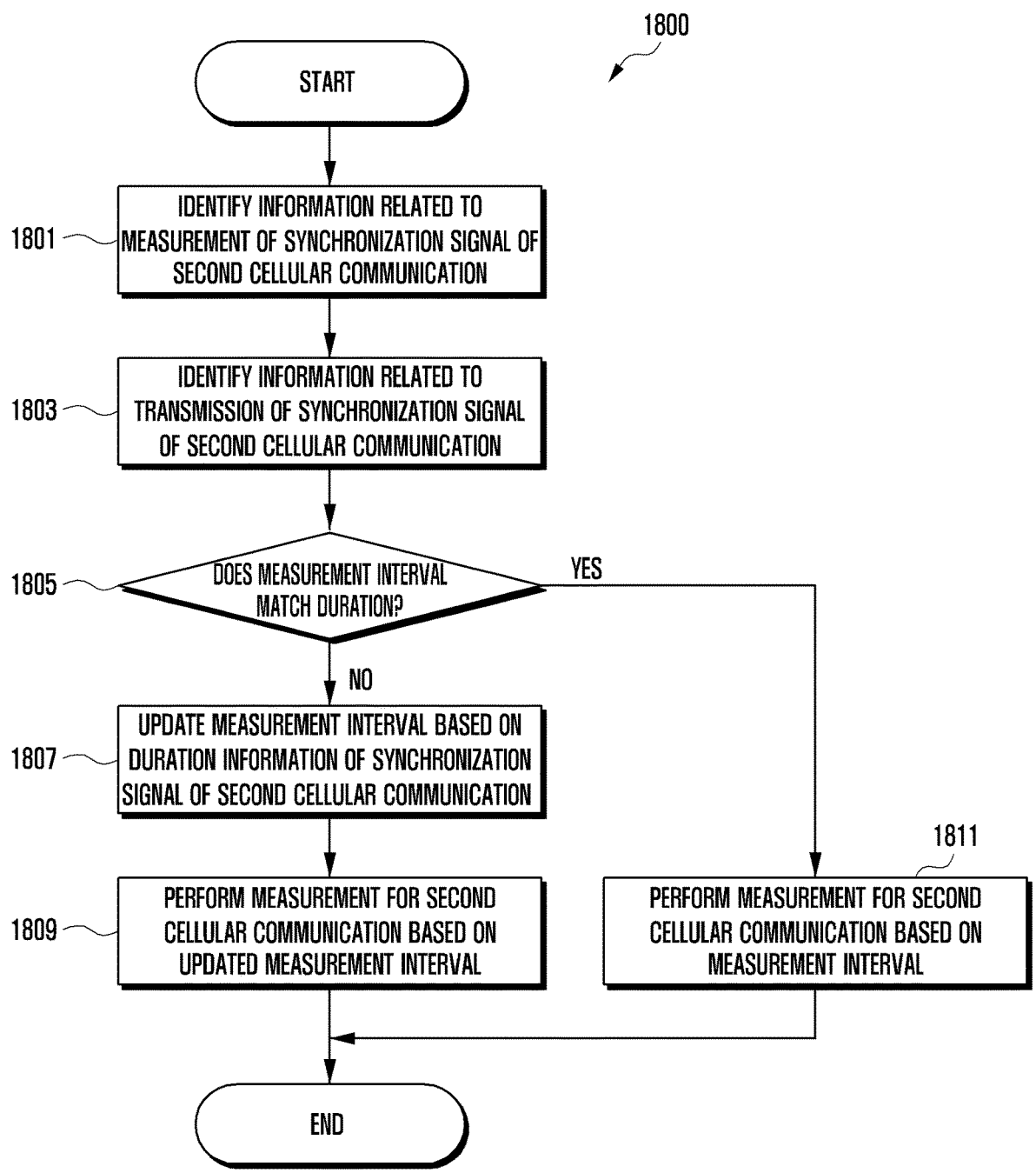
FIG. 18 is a flowchart illustrating an example method of updating a measurement interval in an electronic device according to various embodiments.

FIG. 18 is a flowchart 1800 illustrating an example method of updating a measurement interval in an electronic device according to various embodiments. In the following example, respective operations may be performed in sequence, but may not necessarily be performed in sequence. For example, the sequence of the respective operations may be changed, and at least two operations may be performed in parallel. For example, the electronic device may be the electronic device 101 in FIG. 1, FIG. 6A, or FIG. 6B.

Referring to FIG. 18, according to various embodiments, the electronic device (e.g., the wireless communication module 192 in FIG. 1, the first communication circuit 610 in FIG. 6A, or the third communication circuit 640 in FIG. 6B) may identify information related to measurement of a synchronization signal of the second cellular communication from an RRC message received from the first node providing the first cellular communication in operation 1801. For example, the information related to measurement of the synchronization signal of the second cellular communication may be included in the RRC message as shown in Table 8. The electronic device (e.g., the wireless communication module 192, the first communication circuit 610, or the third communication circuit 640) may identify the interval and/or periodicity for measuring the synchronization signal of the second cellular communication, based on the information related to measurement of the synchronization signal of the second cellular communication.

According to various embodiments, in operation 1803, the electronic device (e.g., the wireless communication module 192, the first communication circuit 610, or the third communication circuit 640) may identify information related to transmission of a synchronization signal of the second cellular communication from the RRC message received from the first node. The electronic device (e.g., the wireless communication module 192, the first communication circuit 610, or the third communication circuit 640) may identify the interval and/or periodicity in which the synchronization signal of the second cellular communication is transmitted, based on the information related to transmission of the synchronization signal of the second cellular communication. For example, the electronic device (e.g., the wireless communication module 192, the first communication circuit 610, or the third communication circuit 640), as shown in Table 1 or Table 2, may identify the duration (e.g., the ssb-duration) and/or periodicity (e.g., the periodicity-andoffset) of the synchronization signal in the RRC message (e.g., RRCconnectionreconfiguration). For example, the electronic device (e.g., the wireless communication module 192, the first communication circuit 610, or the third communication circuit 640) may identify subcarrier spacing related to the transmission of the synchronization signal from the RRC message, as shown in Table 3 or Table 4.

According to various embodiments, the electronic device (e.g., the wireless communication module 192, the first communication circuit 610, or the third communication circuit 640) may identify whether the duration of the synchronization signal of the second cellular communication matches the measurement interval in operation 1805. According to an embodiment, the electronic device (e.g., the wireless communication module 192, the first communication circuit 610, or the third communication circuit 640) may identify whether the measurement interval of the synchronization signal of the second cellular communication, which is identified in operation 1801, matches at least a portion of the duration of the synchronization signal of the second cellular communication, which is identified in operation 1803. For example, although not shown, additionally or alternatively, the electronic device (e.g., the wireless communication module 192, the first communication circuit 610, or the third communication circuit 640) may identify whether the periodicity for measuring the synchronization signal overlaps at least a portion of the periodicity in which the synchronization signal is transmitted.

According to various embodiments, if the duration of the synchronization signal of the second cellular communication does not match the measurement interval (e.g., "NO" in operation 1805), in operation 1807, the electronic device (e.g., the wireless communication module 192, the first communication circuit 610, or the third communication circuit 640) may update the measurement interval of the synchronization signals of cells related to the second cellular communication, based on the duration of the synchronization signal of the second cellular. According to an embodiment, the duration of the synchronization signal of the second cellular communication may not match the measurement interval of the synchronization signal of the second cellular communication in the case where the first node (e.g., the MN 410) that configures the measurement interval of the synchronization signal of the second cellular communication is different from the second node (e.g., the SN 420) that configures the duration of the synchronization signal of the second cellular communication and in the case where information related to the duration of the synchronization signal and the measurement interval are not shared between the two nodes. For example, the second node may include the node that provides the second cellular communication.

According to an embodiment, the electronic device (e.g., the wireless communication module 192, the first communication circuit 610, or the third communication circuit 640), as shown in operation 701 to operation 703 in FIG. 7 or operation 901 to operation 905 in FIG. 9, may update the measurement interval (or the length of the interval) of the synchronization signal, based on the duration (or the length of the interval) of the synchronization signal of the second cellular communication. According to an embodiment, the electronic device (e.g., the wireless communication module 192, the first communication circuit 610, or the third communication circuit 640), as shown in operation 1101 to operation 1103 in FIG. 11, operation 1301 to operation 1305 in FIG. 13, or operation 1501 to operation 1505 in FIG. 15, may configure the measurement periodicity of the synchronization signal, based on the periodicity of the synchronization signal of the second cellular communication.

According to various embodiments, the electronic device (e.g., the wireless communication module 192, the first communication circuit 610, or the third communication circuit 640) may perform measurement of the synchronization signal of the second cellular communication, based on the updated measurement interval of the synchronization signal of the second cellular communication, in operation 1809. According to an embodiment, based on the updated measurement interval of the synchronization signal of the second cellular communication, the electronic device (e.g., the wireless communication module 192, the first communication circuit 610, or the third communication circuit 640) may switch to the first mode, and may perform measurement of synchronization signals of cells related to the second cellular communication in the measurement interval (or the measurement periodicity) of the synchronization signal.

According to various embodiments, if the duration of the synchronization signal of the second cellular communication matches the measurement interval (e.g., "YES" in operation 1805), in operation 1811, the electronic device (e.g., the wireless communication module 192, the first communication circuit 610, or the third communication circuit 640) may perform measurement of the synchronization signal of the second cellular communication, based on the measurement interval of the synchronization signal of the second cellular communication, which is received from the first node.

According to various example embodiments, a method of operating an electronic device (e.g., the electronic device 101 in FIG. 1, 6A, or 6B) including a first communication circuit (e.g., the wireless communication module 192 in FIG. 1, the first communication circuit 610 in FIG. 6A, or the first processing part 642 of the third communication circuit 640 in FIG. 6B) supporting a first cellular communication or a second cellular communication and a second communication circuit (e.g., the wireless communication module 192 in FIG. 1, the second communication circuit 620 in FIG. 6A, or the second processing part 644 of the third communication circuit 640 in FIG. 6B) supporting the second cellular communication may include: performing first cellular communication with a first node using the first communication circuit; based on information related to measurement of a synchronization signal of the second cellular communication not being received from the first node, identifying information related to transmission of the synchronization signal of the second cellular communication; configuring an interval related to measurement of the synchronization signal of the second cellular communication, based on the information related to transmission of the synchronization signal of the second cellular communication; and performing measurement of the synchronization signal of the second cellular communication in the interval related to measurement of the synchronization signal of the second cellular communication.

According to various example embodiments, the information related to transmission of the synchronization signal of the second cellular communication may be received from the first node, based on a control message related to radio resource control (RRC).

According to various example embodiments, the information related to transmission of the synchronization signal of the second cellular communication may include information related to periodicity and/or duration regarding transmission of the synchronization signal of the second cellular communication.

According to various example embodiments, the configuring the interval related to measurement of the synchronization signal may include: configuring the measurement interval of the synchronization signal of the second cellular communication, based on the duration of the synchronization signal of the second cellular communication.

According to various example embodiments, the configuring the interval related to measurement of the synchronization signal may include: configuring the measurement interval of the synchronization signal of the second cellular communication, based on a partial interval, in which the synchronization signal is transmitted, in the duration of the synchronization signal of the second cellular communication.

According to various example embodiments, the configuring the interval related to measurement of the synchronization signal may include: configuring measurement periodicity of the synchronization signal of the second cellular communication, based on at least one of the periodicity of the synchronization signal of the second cellular communication, scheduling request periodicity, or an operation state of the electronic device.

According to various example embodiments, the operation state of the electronic device may include at least one of a battery state of the electronic device, a charging state thereof, or a function that is being executed in the electronic device.

According to various example embodiments, the performing measurement of the synchronization signal of the second cellular communication may include: stopping the first cellular communication with the first node and performing measurement of the synchronization signal of the second cellular communication in the configured measurement interval.

According to various example embodiments, the first cellular communication may include at least one of a long-term evolution (LTE) network or a new radio (NR) network, and the second cellular communication may include an NR network or an LTE network.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure, including the appended claims and their equivalents.

What is claimed is:
1. An electronic device comprising:
  a first communication circuit configured to support a first cellular communication or a second cellular communication; and
  a second communication circuit configured to support the second cellular communication, wherein the first communication circuit is configured to:
perform first cellular communication with a first node;
receive, from the first node, RRC (radio resource control) connection reconfiguration message;
when the received RRC connection reconfiguration message does not contain information related to measurement of a synchronization signal of the second cellular communication and contains information related to transmission of the synchronization signal of the second cellular communication, configure an interval related to measurement of the synchronization signal of the second cellular communication using the information related to transmission of the synchronization signal of the second cellular communication; and
perform measurement of the synchronization signal of the second cellular communication in the interval related to measurement of the synchronization signal of the second cellular communication.

2. The electronic device of claim 1, wherein the first communication circuit is configured to: receive the information related to transmission of the synchronization signal of the second cellular communication from the first node based on a control message related to radio resource control (RRC).

3. The electronic device of claim 2, wherein the information related to transmission of the synchronization signal of the second cellular communication comprises information related to periodicity, subcarrier spacing, and/or duration regarding transmission of the synchronization signal of the second cellular communication.

4. The electronic device of claim 3, wherein the first communication circuit is configured to:
identify a symbol regarding transmission of the synchronization signal of the second cellular communication and a subframe interval regarding transmission of the synchronization signal of the second cellular communication; and
configure the measurement interval of the synchronization signal of the second cellular communication using the identified symbol and the identified subframe interval.

5. The electronic device of claim 3, wherein the first communication circuit is configured to:
configure the measurement interval of the synchronization signal of the second cellular communication using the duration regarding transmission of the synchronization signal of the second cellular communication; and
update the measurement interval of the synchronization signal of the second cellular communication using a partial interval, in which the synchronization signal is detected, in the duration of the synchronization signal of the second cellular communication.

6. The electronic device of claim 3, wherein the first communication circuit is configured to configure measurement periodicity of the synchronization signal of the second cellular communication based on at least one of the periodicity of the synchronization signal of the second cellular communication, scheduling request periodicity, or an operation state of the electronic device.

7. The electronic device of claim 6, wherein the operation state of the electronic device comprises at least one of a battery state of the electronic device, a charging state thereof, or a function being executed in the electronic device.

8. The electronic device of claim 1, wherein the first communication circuit is configured to stop the first cellular communication with the first node and perform measurement of the synchronization signal of the second cellular communication in the configured measurement interval.

9. The electronic device of claim 8, wherein the second communication circuit is configured to remain in an inactive state while the first communication circuit measures the synchronization signal of the second cellular communication.

10. The electronic device of claim 1, wherein the first cellular communication comprises at least one of a long-term evolution (LTE) network or a new radio (NR) network, and
wherein the second cellular communication comprises an NR network or an LTE network.

11. A method of operating an electronic device comprising a first communication circuit supporting a first cellular communication or a second cellular communication and a second communication circuit supporting the second cellular communication, the method comprising:
performing first cellular communication with a first node using the first communication circuit;
receiving, from the first node, RRC (radio resource control) connection reconfiguration message;
when the received RRC connection reconfiguration message does not contain information related to measurement of a synchronization signal of the second cellular communication and contains information related to transmission of the synchronization signal of the second cellular communication, configuring an interval related to measurement of the synchronization signal of the second cellular communication using the information related to transmission of the synchronization signal of the second cellular communication; and
performing measurement of the synchronization signal of the second cellular communication in the interval related to measurement of the synchronization signal of the second cellular communication.

12. The method of claim 11, wherein the information related to transmission of the synchronization signal of the second cellular communication is received from the first node based on a control message related to radio resource control (RRC).

13. The method of claim 12, wherein the information related to transmission of the synchronization signal of the second cellular communication comprises information related to periodicity, subcarrier spacing, and/or duration regarding transmission of the synchronization signal of the second cellular communication.

14. The method of claim 13, wherein the configuring the interval related to measurement of the synchronization signal comprises:
identifying a symbol regarding transmission of the synchronization signal of the second cellular communication and a subframe interval regarding transmission of the synchronization signal of the second cellular communication;
configuring the measurement interval of the synchronization signal of the second cellular communication using the identified symbol and the identified subframe interval.

15. The method of claim 13, wherein the configuring the interval related to measurement of the synchronization signal comprises:
configuring the measurement interval of the synchronization signal of the second cellular communication using the duration regarding transmission of the synchronization signal of the second cellular communication; and updating the measurement interval of the synchronization signal of the second cellular communication using a partial interval, in which the synchronization signal is detected, in the duration of the synchronization signal of the second cellular communication.

16. The method of claim 13, wherein the configuring the interval related to measurement of the synchronization signal comprises: configuring measurement periodicity of the synchronization signal of the second cellular communication based on at least one of the periodicity of the synchronization signal of the second cellular communication, scheduling request periodicity, or an operation state of the electronic device.

17. The method of claim 16, wherein the operation state of the electronic device comprises at least one of a battery state of the electronic device, a charging state thereof, or a function that is being executed in the electronic device.

18. The method of claim 11, wherein the performing measurement of the synchronization signal of the second cellular communication comprises: stopping the first cellular communication with the first node and performing measurement of the synchronization signal of the second cellular communication in the configured measurement interval.

19. The method of claim 11, wherein the first cellular communication comprises at least one of a long-term evolution (LTE) network or a new radio (NR) network, and
wherein the second cellular communication comprises an NR network or an LTE network.

* * * * *